(12) United States Patent
Liu

(10) Patent No.: US 12,077,285 B2
(45) Date of Patent: Sep. 3, 2024

(54) FREE PROPELLER ASSEMBLY STRUCTURE AND AIRCRAFT STRUCTURE HAVING THE SAME

(71) Applicants: Bao-Shen Liu, New Taipei (CN); Yu-Chia Liu, New Taipei (CN)

(72) Inventor: Bao-Shen Liu, New Taipei (CN)

(73) Assignees: Bao-Shen Liu, New Taipei (TW); Yu-Chia Liu, New Taipei (TW)

( * ) Notice: Subject to any disclaimer, the term of this patent is extended or adjusted under 35 U.S.C. 154(b) by 864 days.

(21) Appl. No.: 17/032,126

(22) Filed: Sep. 25, 2020

(65) Prior Publication Data

US 2021/0070429 A1    Mar. 11, 2021

Related U.S. Application Data

(63) Continuation-in-part of application No. PCT/CN2019/079508, filed on Mar. 25, 2019.

(30) Foreign Application Priority Data

Mar. 28, 2018 (CN) .......................... 201810263379.3

(51) Int. Cl.
*B64C 27/10* (2023.01)
*B64C 27/26* (2006.01)
(Continued)

(52) U.S. Cl.
CPC .............. *B64C 27/10* (2013.01); *B64C 27/26* (2013.01); *B64C 27/72* (2013.01); *B64C 39/12* (2013.01);
(Continued)

(58) Field of Classification Search
CPC .... B64C 1/00; B64C 3/10; B64C 3/32; B64C 5/06; B64C 9/00; B64C 27/12;
(Continued)

(56) References Cited

U.S. PATENT DOCUMENTS 5,653,404 A    8/1997    Ploshkin
8,845,290 B1 *    9/2014    Lugg ...................... B64C 27/68
416/147

(Continued)

FOREIGN PATENT DOCUMENTS

CN    101007569 A    8/2007
CN    202593855 U    12/2012
(Continued)

*Primary Examiner* — Brady W Frazier
*Assistant Examiner* — Shanna Danielle Glover
(74) *Attorney, Agent, or Firm* — Best & Flanagan LLP

(57) ABSTRACT

The present invention relates to a free propeller assembly structure and an aircraft structure has the free propeller assembly. The free propeller assembly structure has at least one free propeller assembly. Each of the at least one free propeller assembly has a circular shaft, a main rotor, a signal transmitting device, and a rotor blade assembly. The main rotor has a shaft hole and multiple blade mounting structures radially disposed. Each blade mounting structure is provided with a positioning recess for mounting a driving motor in each positioning recess. The signal transmitting device includes multiple signal transmitters that are able to transmit interpretable electronic signals or photonic signals. The rotor blade assembly includes at least two rotor blades. One end of each rotor blade is connected with an open end of the positioning recesses of a corresponding one of the blade mounting structures.

6 Claims, 16 Drawing Sheets

(51) Int. Cl.
*B64C 27/72* (2006.01)
*B64C 39/12* (2006.01)
*F16H 1/14* (2006.01)

(52) U.S. Cl.
CPC ........ *F16H 1/14* (2013.01); *B64C 2027/7211* (2013.01)

(58) Field of Classification Search
CPC . B64C 27/473; B64C 27/82; B64C 2009/005; B64C 2027/7216; B64C 2027/7244; B64C 2027/7211; B64C 2027/7205; B64C 27/22; B64C 27/26; B64C 27/625; B64C 27/72; B64D 27/24
See application file for complete search history.

(56) References Cited

U.S. PATENT DOCUMENTS

| | | | |
|---|---|---|---|
| 2010/0243821 A1* | 9/2010 | Lim | B64C 27/08 244/7 A |
| 2015/0028597 A1* | 1/2015 | Eller | B64C 27/72 290/1 A |
| 2015/0203199 A1 | 7/2015 | Chai | |
| 2018/0281936 A1* | 10/2018 | Robertson | B64D 27/10 |
| 2018/0305005 A1* | 10/2018 | Parks | B64C 27/30 |
| 2021/0147076 A1* | 5/2021 | Stearns | B64C 27/10 |

FOREIGN PATENT DOCUMENTS

| | | |
|---|---|---|
| CN | 105984586 A | 10/2016 |
| CN | 107117304 A | 9/2017 |
| DE | 3830309 A1 | 3/1990 |
| RU | 2101214 C1 | 1/1998 |

\* cited by examiner

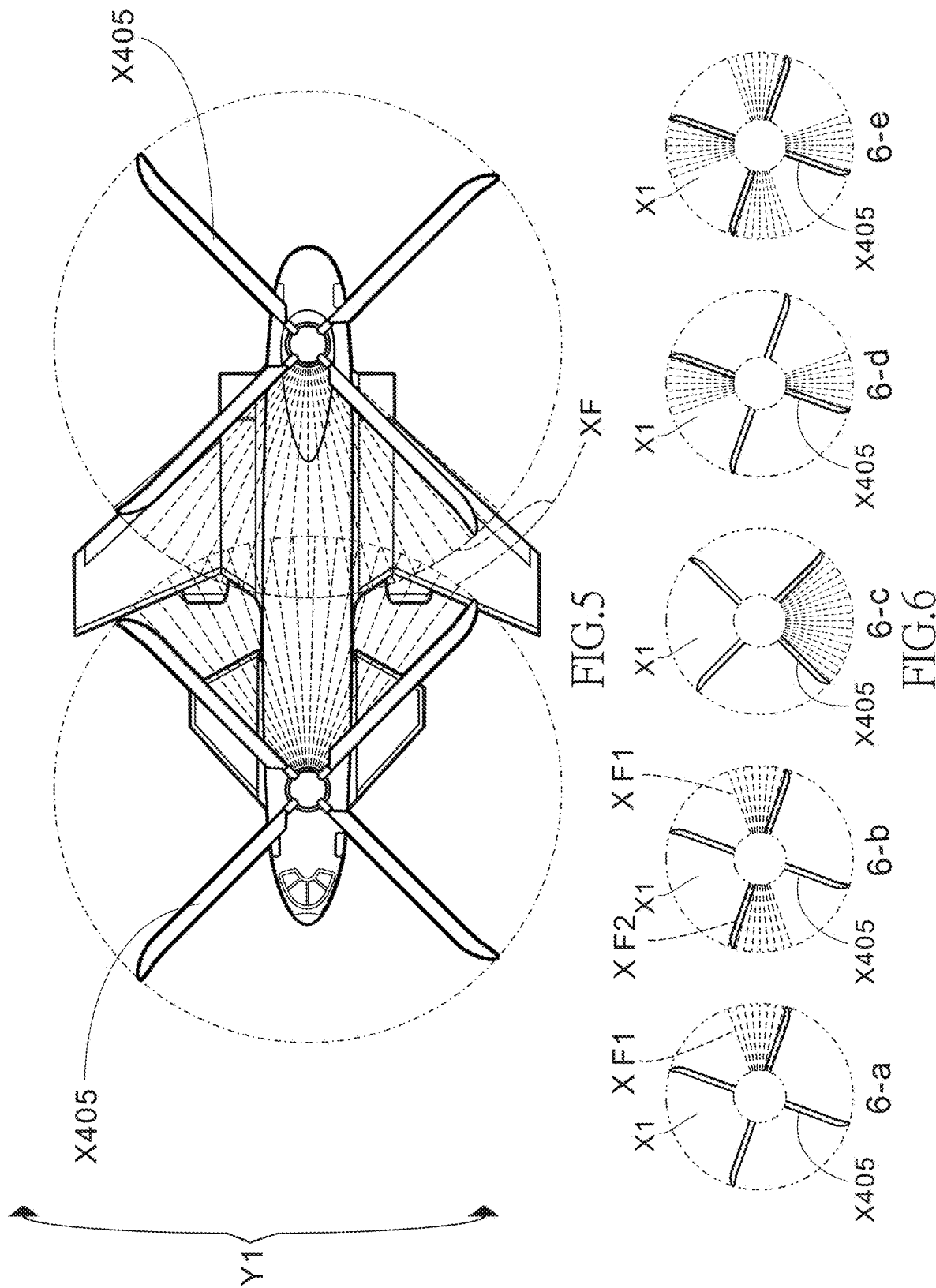

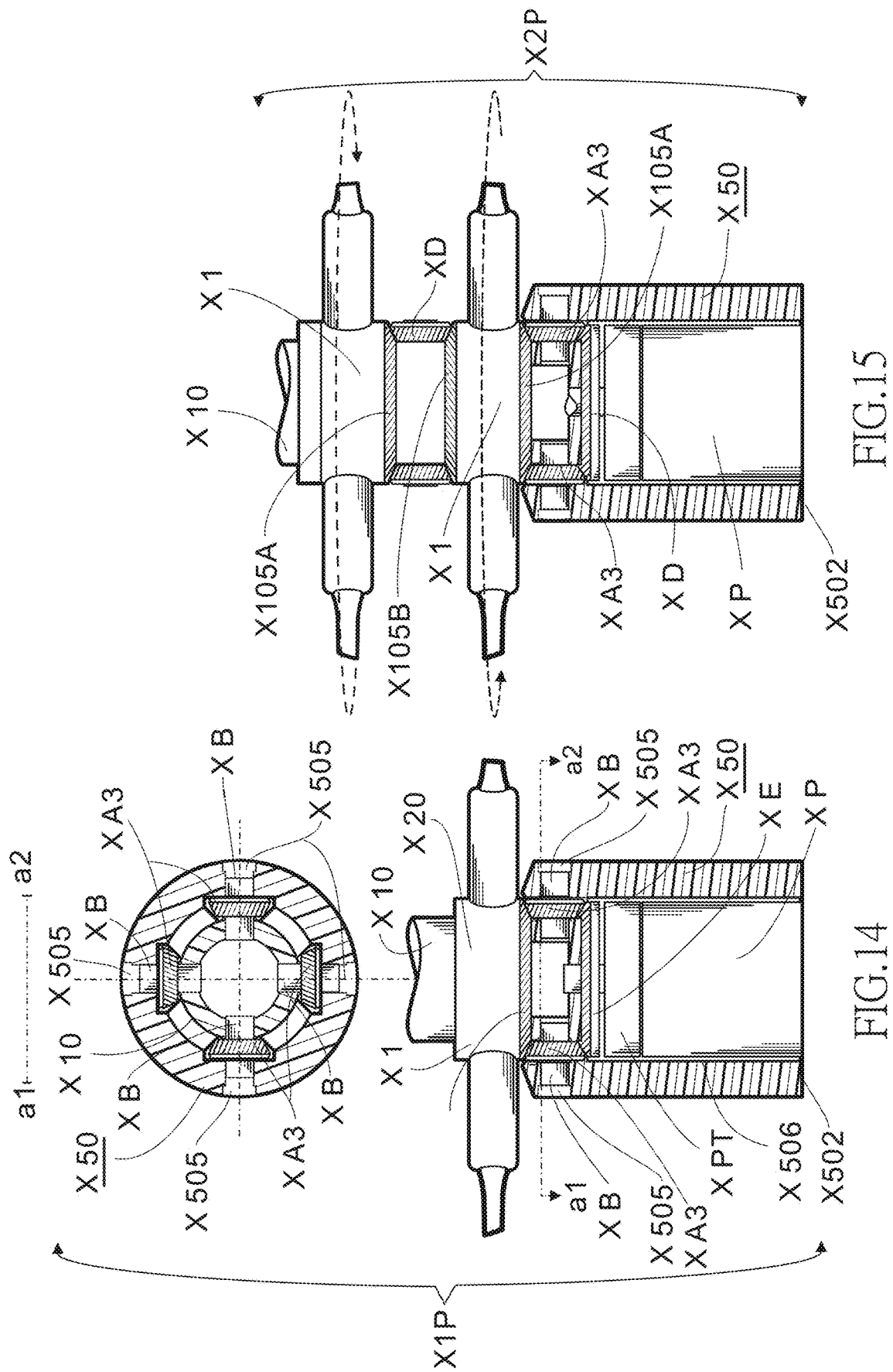

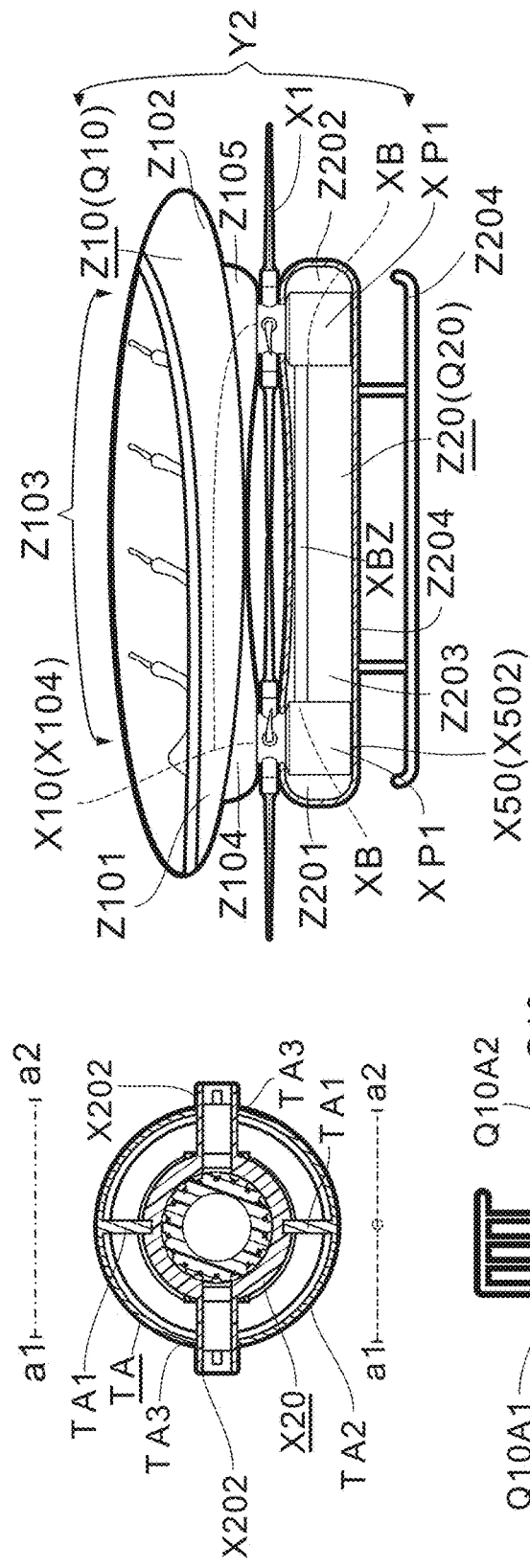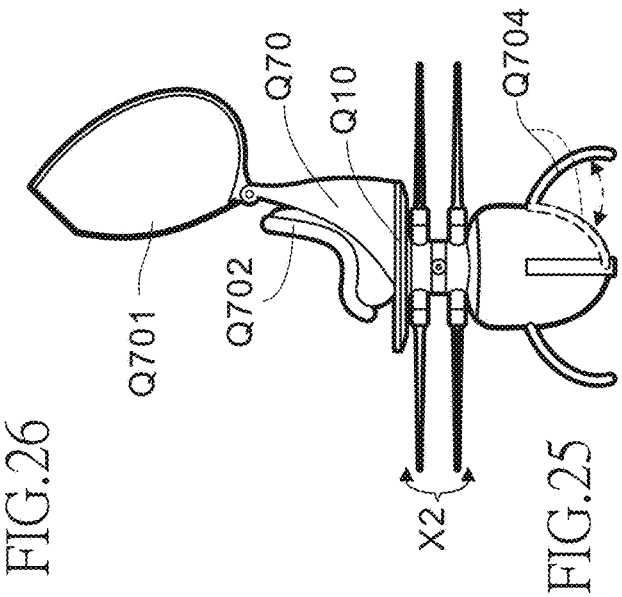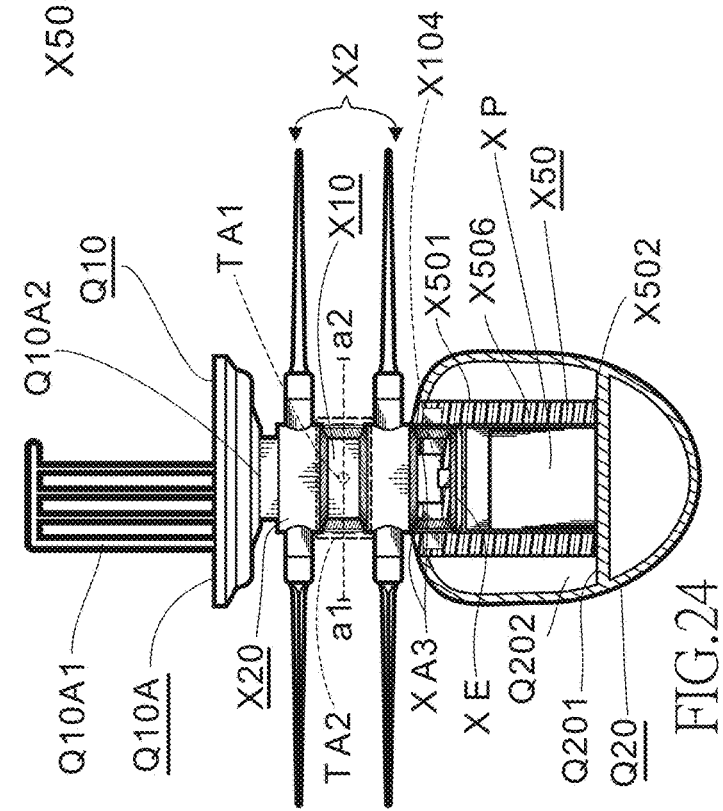

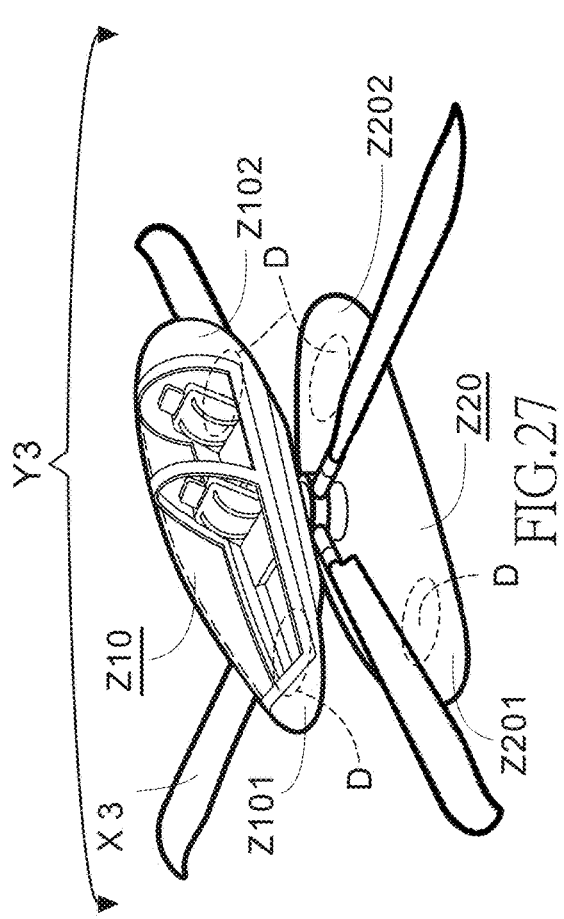
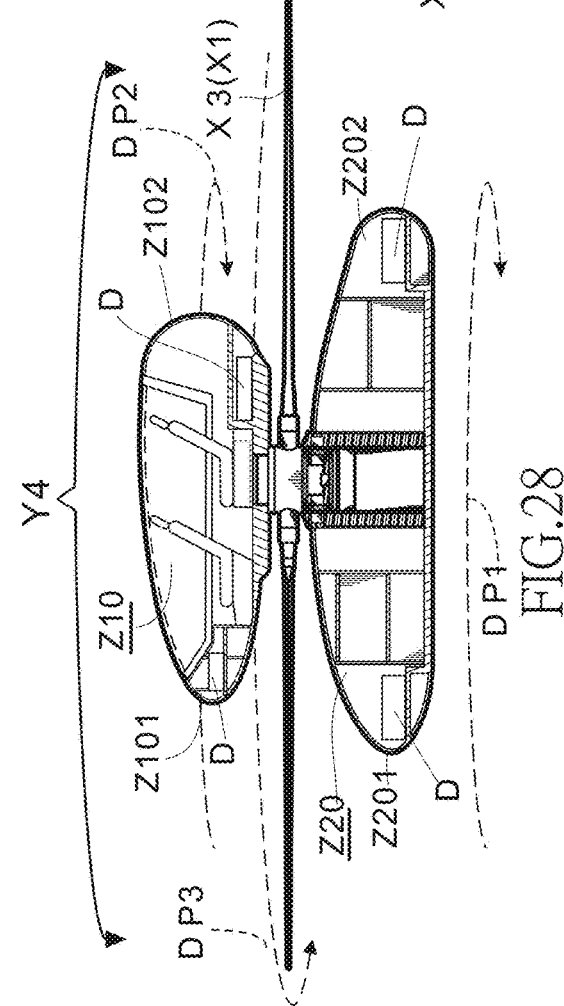
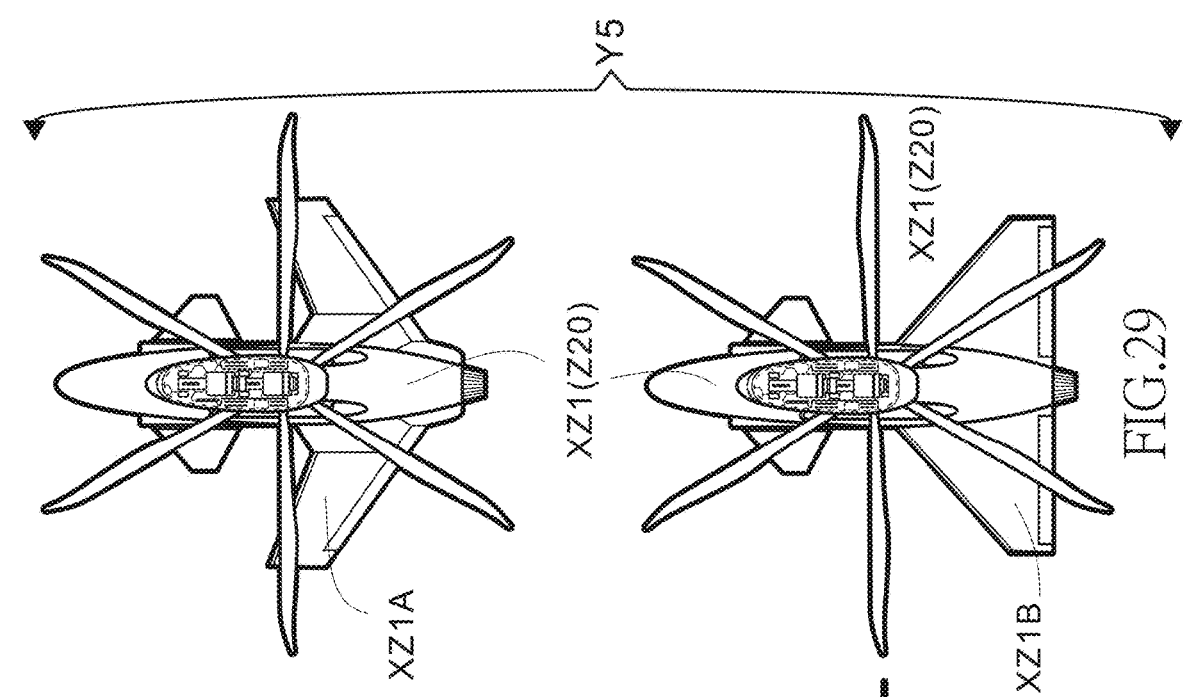

FREE PROPELLER ASSEMBLY STRUCTURE AND AIRCRAFT STRUCTURE HAVING THE SAME

CROSS-REFERENCE TO RELATED APPLICATION

This application is a continuation-in-part (CIP) application of International Application No. PCT/CN2019/079508 filed on Mar. 25, 2019, which is incorporated herein by reference.

BACKGROUND OF THE INVENTION

1. Field of the Invention

The present invention relates a free propeller assembly structure and an aircraft structure having the free propeller assembly structure, especially to a free propeller assembly structure that is used in all kinds of passenger helicopters, aircrafts capable of vertical lifting, and aircrafts that need to change angles of rotor blades at will.

2. Description of the Prior Art(s)

With reference to FIG. 1, a conventional propeller assembly of a conventional helicopter includes propeller blades 1, horizontal hinges (also called flapping hinges) 2, vertical hinges (also called drag hinges or lead-lag hinges) 3, pitching hinges (also called feathering hinges) 4, transmission arms 5, link rods 6A, control rods 6B, a rotating ring 7, a non-rotating ring 8 connecting with an universal joint.

As can be seen from FIG. 1, the conventional propeller assembly is mechanically operated. In the conventional propeller assembly, turnings of the propeller blades 1 are controlled by the link rods 6A and are also restricted by the mechanical operation.

When one of the propeller blades 1 is driven by the link rod 6A to a specific position, positions of the other propeller blades 1 are restricted by mechanical structure. Consequently, a rotation range of each propeller blade 1 is really small.

Shortcomings of the conventional propeller assembly and the conventional helicopter caused structures are as follows.

1. The conventional helicopters are criticized by the public for being like flying coffins due to not easy for pilots to escape.
2. A center of gravity of the conventional helicopter is mainly decided by positions of the driver's seat and the controls and is unable to be arranged in a better way, causing restrictions on loading space and loading position.
3. In order to balance the conventional helicopter, load weight on the conventional helicopter cannot be arranged with a more reasonable design.
4. The conventional helicopter has a flight path, which is like a flight path of a weight, being not flexible.
5. The conventional helicopters are also limited in structure, such that other designs that are able to overcome torque on a main rotor system cannot be provided.
6. Under the limitation of traditional structure, the conventional helicopter is unable to be designed for higher speed flight.
7. In terms of various special purposes, the conventional helicopters need to have a variety of alternative configurations.
8. For water sources, such as ponds, reservoirs, rivers, lakes, and so on, near an area where a wildfire occurs, the conventional helicopter is unable to enter and fetch water directly from the water sources and is also unable to fill water repeatedly in a faster speed to effectively fight fire.
9. In order to evacuate people and to deliver relief supplies, the conventional helicopter needs larger loading space for carrying the evacuated people and the relief supplies.
10. In addition, the structure of the conventional propeller assembly of the conventional helicopter is restricted and the freedom of rotation of the rotor blades is greatly restricted. As a result, greater wind pressure for lifting fuselage of the helicopter cannot be generated and flight altitude and load capacity of the helicopter is affected. In particular, when in the high plateau, the air is thin and the oxygen for combustion of chemical energy is insufficient, plus the freedom of rotation of the rotor blades being restricted. Consequently, the rotor blades are unable to generate enough wind pressure and flight capability of the helicopter is limited.
11. The sky is the largest space for transportation development. Under the rapid population growth and in order to meet the requirement of high efficiency and fast business logistics, public transportation between cities and towns below 5000 meters above sea level and within 300 kilometers and cargo freight require efficient helicopters. In particular, an airport cannot be built in the mountain due to rugged terrain, a helicopter that can accommodate more passengers and load more goods is needed, so as to meet the requirements of passenger capacity and efficient and fast transshipment of goods and significantly reduce the number of airplanes requiring large runways and terminals.
12. The conventional propeller assembly has restricted and complicated mechanical structure and is easy to wear, which affects the service life of the conventional propeller assembly. Moreover, the structure of the conventional propeller assembly cannot prevent sands and dusts from entering, is not waterproof, and has complicated maintenance procedures.
13. For many years, the aviation industry has been dreamed to research and develop "heliplanes".
14. In the twenty-first century, intelligent electronics (electronic microprocessors), the Internet using big data, the development of the new energy, and future technology all develop at an astonishing high speed. The conventional helicopter must be changed and designed in a bolder and effective wary in terms of flight performance, control methods, driving safety, how people are carried, carrying space, and so on.

The inventor feel deeply that if he can provide a free propeller assembly that has rotor blades with unrestricted freedom of rotation and turning angles of the rotor blades can be precisely controlled at will. Moreover, a cockpit of an aircraft structure having the free propeller assembly can be designed with new and disruptive creativity. Accordingly, not only the conventional propeller assembly can be changed, but also the efficiency and the use of the conventional propeller assembly would be subverted and a variety of new helicopters would be produced.

Therefore, the inventor of the present invention uses modern advanced electronic technology to provide a free propeller assembly structure. The free propeller assembly structure includes a circular shaft, a main rotor, a signal transmitting device and a rotor blade assembly, and a series of free propeller assembly with different functions can be further designed.

In addition, based on the free propeller assembly, fuselage for setting up loading structure can be installed on a top and a bottom of the free propeller assembly, so as to overcome many shortcomings of the above-mentioned conventional helicopter and to provide a variety of aircrafts that have never seen before.

SUMMARY OF THE INVENTION

The first main objective of the present invention is to provide a free propeller assembly structure that has at least one free propeller assembly. Each of the at least one free propeller assembly has a circular shaft, a main rotor, a signal transmitting device, and a rotor blade assembly. The circular shaft has an outer side surface and two ends. The main rotor has a shaft hole and multiple blade mounting structures radially disposed on a periphery of the main rotor. Each blade mounting structure is provided with a positioning recess. The positioning recess of each blade mounting structure is mounted with a driving motor. The signal transmitting device includes multiple signal transmitters that are able to transmit interpretable electronic signals or photonic signals. The rotor blade assembly includes at least two rotor blades. Each rotor blade is elongated and has two ends. One end of the rotor blade is connected with an open end of the positioning recesses of a corresponding one of the blade mounting structures.

The second main objective of the present invention is to provide an aircraft structure that has a fuselage formed as a long and wide cabin and having two ends, a main wing assembly having two wings disposed oppositely on the long and wide cabin, two propeller engine assemblies mounted in the wings respectively, and two free propeller assemblies mounted on a top of the fuselage.

The third main objective of the present invention is to provide an aircraft structure that has an upper fuselage, a lower fuselage, an adapting base, and two free propeller assemblies. The upper fuselage is formed as an independent platform and is connected to the open end of the circular shaft. On the platform, space for one driver is provided. The lower fuselage is formed as an independent cabin and has at least one deck. The adapting base is formed as a column and has an end connected with the end of the circular shaft and provided with a recess and a fixed end connected to the at least one deck of the lower fuselage, so as to combine the upper fuselage and the lower fuselage together. The two free propeller assemblies are mounted to the adapting base and the circular shaft.

The fourth main objective of the present invention is to provide an aircraft structure that has an upper fuselage, a lower fuselage, an adapting base, and at least one free propeller assembly. The upper fuselage is formed as an independent housing for accommodating at least one driver. The upper fuselage has two ends. The lower fuselage is formed as an independent housing for accommodating at least one deck, a power mechanism and people. The lower fuselage has two ends. The adapting base is formed as a column and has an end connected with the end of the circular shaft and provided with a recess and a fixed end connected to the at least one deck of the lower fuselage, so as to combine the upper fuselage and the lower fuselage together. The at least one free propeller assembly is mounted to the adapting base and the circular shaft. One end of the rotor blade is connected with an open end of the positioning recesses of a corresponding one of the blade mounting structures.

The free propeller assembly structure and the aircraft structure having the free propeller assembly structure have advantages as follows.

1. Space occupied by the free propeller assembly is greatly reduced.
2. The freedoms of rotations of the rotor blades of the rotor blade assembly are not restricted. Therefore, the aircraft having the free propeller assembly can turn more agilely, has greater load capacity, and can fly higher.
3. With the upper fuselage structure and the lower fuselage structure, the operator's seat and the operating system can be omitted in the lower fuselage structure to free up usable space, which causes revolutionary change to the helicopter. Accordingly, space in the aircraft structure can be used efficiently.
4. The upper fuselage structure is for mounting the operator's seat and some operating system and the free propeller assembly is not disposed right above the pilot. Therefore, it is easy for the pilot to escape while accident happens.
5. The lower fuselage structure does not have any free propeller assembly that is disposed right above the pilot, so as to provide the pilot with a wide field of vision.
6. The upper and lower fuselage structures are helpful in arranging the center of gravity of the aircraft structure. With the free propeller assembly that is disposed at the middle, the aircraft structure would not fly like a weight.
7. By providing an upper fuselage structure that is disposed above the free propeller assembly, passengers inside the upper fuselage structure can hear smaller noises with the use of sound insulation equipment. In particular, since there is only one main rotor in the free propeller assembly, noises made by the free propeller assembly is small and is helpful in developing silent aircraft.
8. By mounting gyros and flywheels on the upper and lower fuselage structures, torque of the free propeller assembly can be balanced. Accordingly, tail assembly and equipment and structures relating to the tail assembly can be omitted, which would cause disruptive changes to an appearance of the helicopter.
9. By adding wings on two opposite sides of the lower fuselage structure, the aircraft structure can vertically take off and land and can fly in high speed. The wings may be forward-swept wings, swept-wings, or other wings that conform to the aerodynamics.
10. Through structural advantage, the lower fuselage structure provide positions at five locations such as front, rear, left, right and bottom for the helicopter to store goods. Moreover, the lower fuselage structure is also good for arranging weight of the goods without considering weights of the pilot and the other equipment. Therefore, the weight of the goods can be arranged reasonably for all kinds of missions.
11. With the modular fuselage structure, the aircraft structure of the present invention can be used in multi-purpose and the production cost can also be greatly reduced. Since the operator's seat and the operating system are no more suspense in designing the aircraft structure, the applications and designs of the helicopter can be revolutionary changed. A large usable space is freed up, which is especially help in transporting people and goods, in emergency rescue, or in all kinds of other missions.
12. On the aircraft structure of the present invention, multiple hatches for different purposes may be disposed on a windward side, left and right sides, rear sides and bottom sides. In addition, multiple visible transparent windows may also be disposed on the windward side, the left and right sides, the rear sides and the bottom sides, so as to allow the people and the goods to be loaded on the aircraft structure in a quick speed that have never seen before. The people can sit at a position that has a good field of vision and there would plenty of space for emergency rescue.
13. Without the operator's seat and the relative equipment, there are plenty of space for disposing multiple rows of seats, allowing the aircraft structure of the present invention to be especially suitable for transporting passengers.
14. The fuselage of the aircraft structure of the present invention can be designed as a water cabin that can enter the water directly, so as to draw and store water for extinguishing fires, which is very helpful in fire-fighting.
15. In a tandem free Double Free propeller assembly-vertical ascent aircraft, with the controllable rotor blades of the free propeller assembly, the aircraft is able to generate and store wind power. The wind power is provided for the takeoff and landing of the tandem free Double Free propeller assembly-vertical ascent aircraft. Therefore, the tandem free Double Free propeller assembly-vertical ascent aircraft does not consume the electric power that it carries, which makes it possible to allow a passenger airplane to vertically take off and land.
16. The aircraft structure having the free propeller assembly allows flights for family or individual travel or work become normal.
17. The aircraft structure having the free propeller assembly provides public transportation between cities and towns below 5000 meters above sea level and within 300 kilometers and cargo freight. In particular, since an airport cannot be built in the mountain, a helicopter that can accommodate more passengers and load more goods is needed, so as to meet the requirements of passenger capacity and efficient and fast transshipment of goods and significantly reduce the number of airplanes requiring large runways and terminals. By forming the tandem free Double Free propeller assembly-vertical ascent aircraft, the aircraft is able to generate wind power on an upwind side. The tandem free Double Free propeller assembly-vertical ascent aircraft does not consume the electric power that it carries, which makes it possible to allow a passenger airplane to vertically take off and land.
18. The aircraft structure having the free propeller assembly makes full use of modern technology, Internet technology, and new energy, allowing unmanned aerial driving in the air has the same development as transportation on the ground. Moreover, the aircraft structure having the free propeller assembly also allows more effective and safer applications of air traffic in the future. People using the present invention also changes in high efficiency.

BRIEF DESCRIPTION OF THE DRAWINGS

FIG. 5 is an operational top view of the first embodiment of the free propeller assembly in FIG. 4;

FIGS. 6A to 6E are schematic top views of the first embodiment of the free propeller assembly in FIG. 4;

FIG. 14 are an enlarged side view in partial section and an enlarged top view in partial section of a seventh embodiment of a free propeller assembly with engine in accordance with the present invention;

FIG. 15 is an enlarged side view in partial section of a seventh embodiment of a free propeller assembly in accordance with the present invention;

FIG. 24 is a side view in partial section and a top of a fifteenth embodiment of an aircraft in accordance with the present invention;

FIG. 25 is an enlarged side view of a sixteenth embodiment of an aircraft in accordance with the present invention;

FIG. 26 is a side view of a seventeenth embodiment of an aircraft in accordance with the present invention;

FIG. 27 is a perspective view of an eighteenth embodiment of an aircraft in accordance with the present invention;

FIG. 28 is a cross-sectional side view of a nineteenth embodiment of an aircraft in accordance with the present invention;

FIG. 29 are top views of a twentieth embodiment of aircrafts in accordance with the present invention;

FIG. 31 is a perspective view of a twenty-second embodiment of an aircraft in accordance with the present invention; and FIG. 32 is a cross-sectional side view of a twenty-third embodiment of an aircraft in accordance with the present invention.

DETAILED DESCRIPTION OF THE PREFERRED EMBODIMENTS

Figure 1:
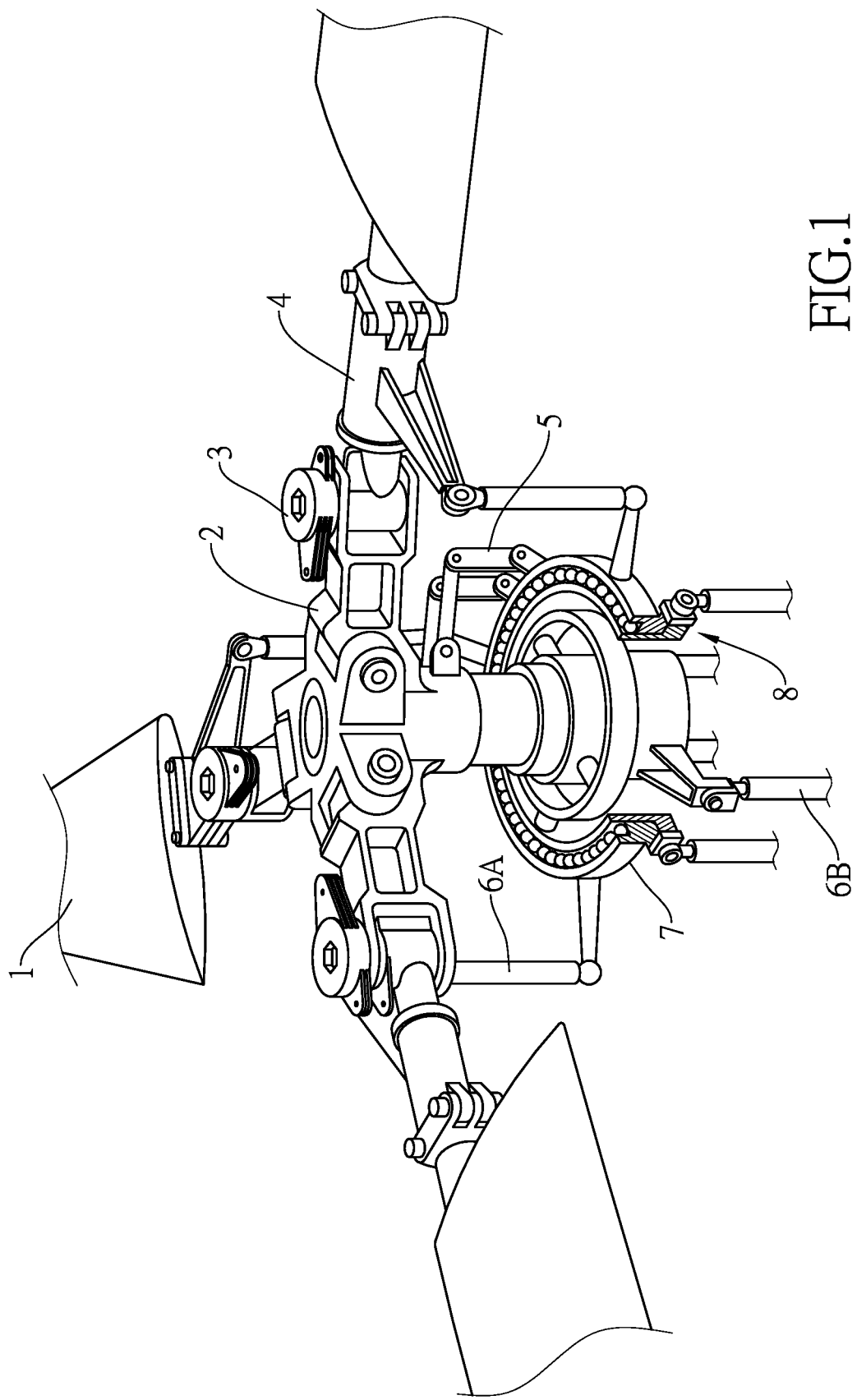
FIG. 1 is an enlarged perspective view of a propeller assembly of a conventional helicopter in accordance with the prior art.
Figure 2:
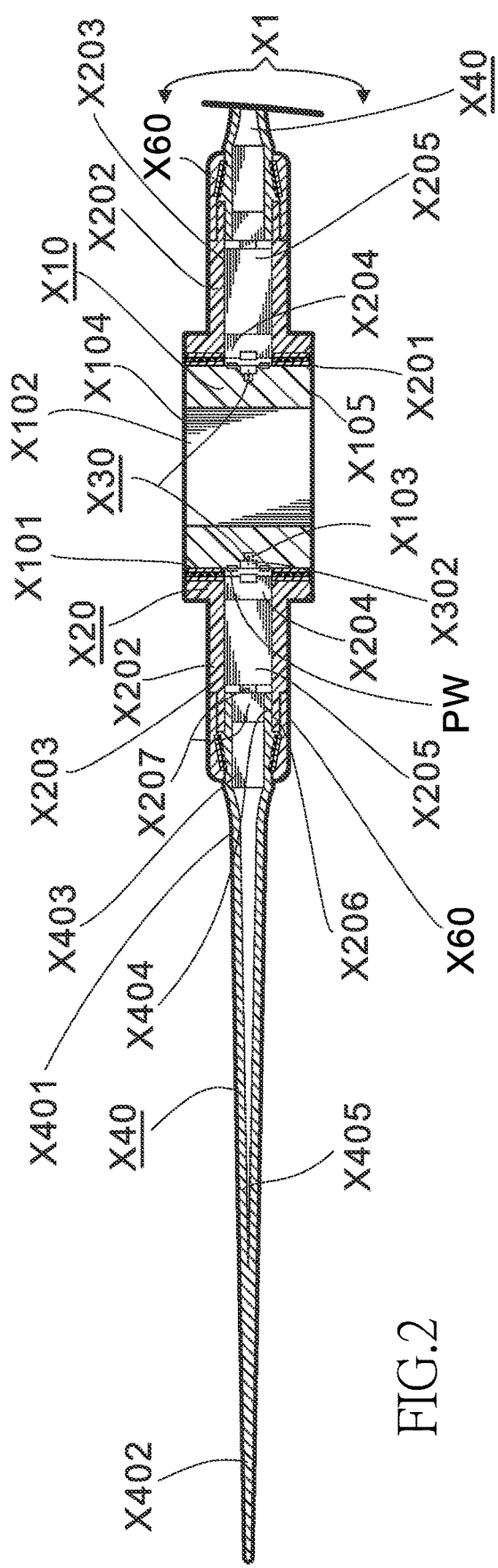
FIG. 2 is an enlarged cross-sectional side view of a first embodiment of a free propeller assembly in accordance with the present invention.
Figure 3:
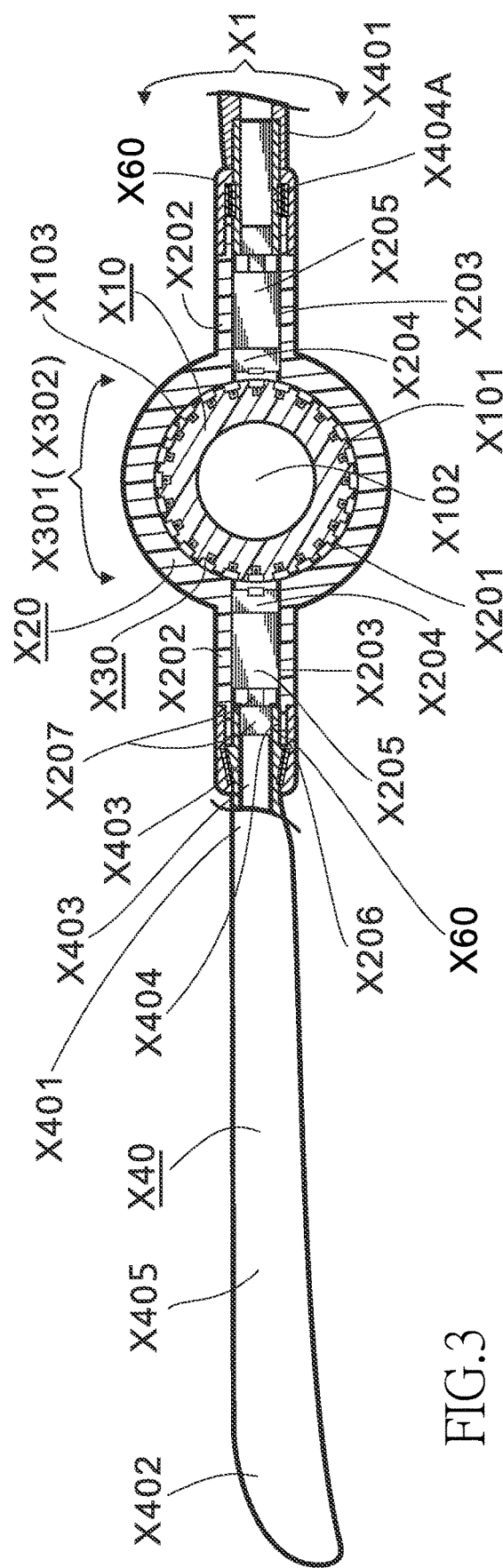
FIG. 3 is an enlarged cross-sectional top view of the first embodiment of the free propeller assembly in FIG. 2.
Figure 4:
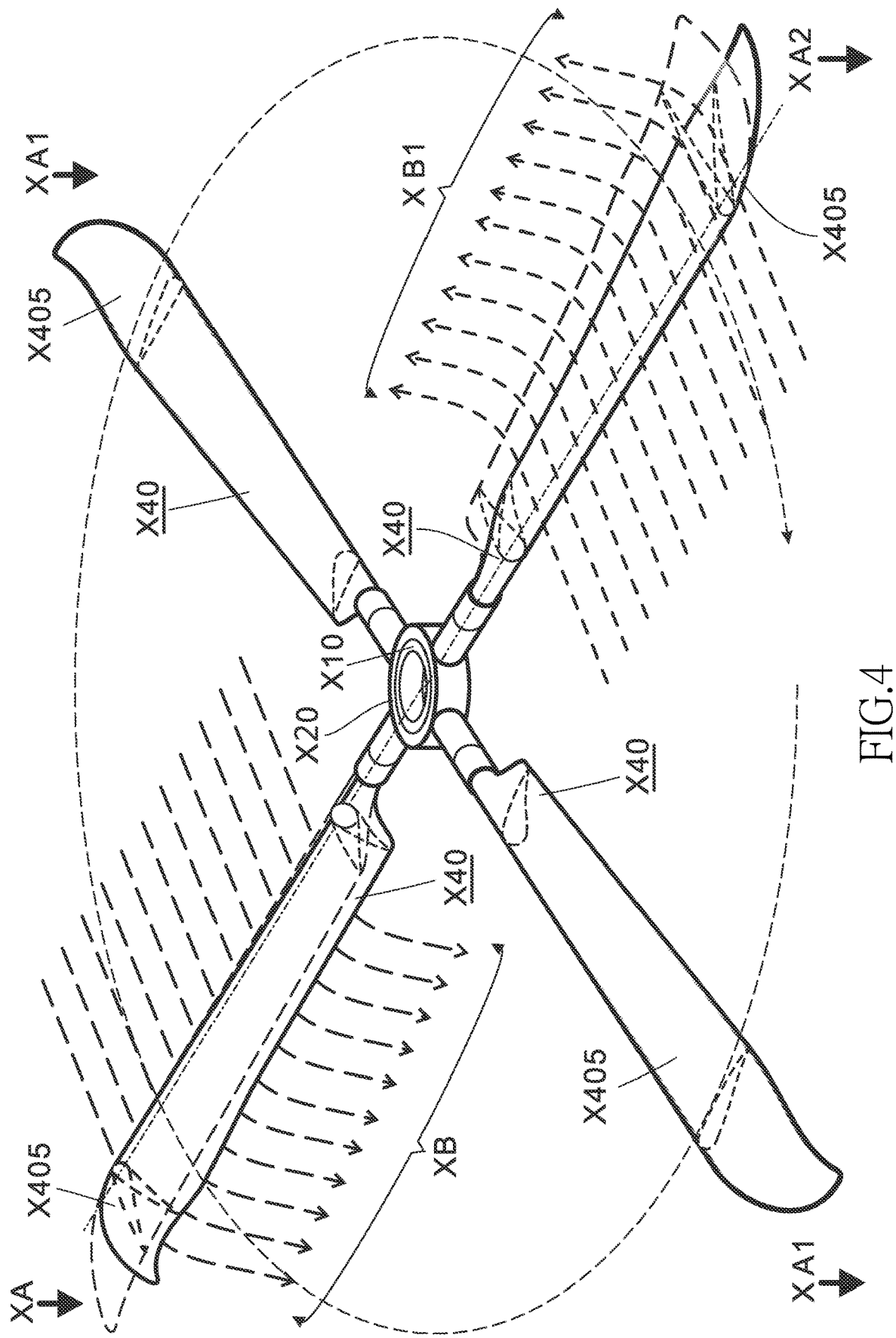
FIG. 4 is a perspective view of the first embodiment of the free propeller assembly in FIG. 2.

With reference to FIGS. 2, 3, and 4, a free propeller assembly structure in accordance with the present invention comprises at least one free propeller assembly X1 and each of the at least one free propeller assembly comprises a circular shaft X10, a main rotor X20, a signal transmitting device X30, and a rotor blade assembly X40.

The a circular shaft X10 has an outer side surface X101 and is hollow X102, and the outer side surface X101 is provided with a mounting structure X103 for mounting the signal transmitting device X30. The mounting structure X103 may be changed to be adapted to a number of signal transmitters X302 and a number of power sources PW in the mounting structure X103. The mounting structure X103 may be formed by recesses and protrusions, or by various other structures or by mounting an independent device or mechanism (such as a detachable annular mount) in the outer side surface X101 of the circular shaft X10. Moreover, the circular shaft X10 further has two ends X104, X105 for connecting with other mechanisms.

The main rotor X20 has a shaft hole X201 and multiple blade mounting structures X202 radially disposed on a periphery of the main rotor X20. Each of the blade mounting structures X202 is provided with a positioning recess X203. The positioning recess X203 is mounted with a decoder X204, a driving motor X205, and so on.

The signal transmitting device X30 includes multiple signal transmitters X302 that are able to transmit interpretable electronic signals or photonic signals or other signals. For instance, the signal transmitters X302 may be light beam emitters X301. Specifically, the signal transmitters X302 of the signal transmitting device X30 are mounted on the outer side surface X101 of the circular shaft X10 and correspond in position to the decoders X204 respectively. Each signal transmitter X302 radially transmits signals outwardly.

The rotor blade assembly X40 includes at least two rotor blades, and each rotor blade is elongated and has two ends X401, X402. An appearance of the rotor blade may be conventional fan blades or rotor blades X405 of various conventional flight vehicles and aircrafts. One end X401 of the rotor blade is provided with a slot X403 and a rotating shaft X404 and is positioned in and is connected with an open end X206 of the positioning recesses X203 of a corresponding one of the blade mounting structures X202 via a positioning ring X60 or via other conventional connecting ways, such as locking, engaging, mounting and the like, or by adding other components, to fix relative positions of the end X401 of the rotor blade of the rotor blade assembly X40 and the open end X206 of the corresponding blade mounting structure X202 and to allow the rotor blade to be turned by a corresponding one of the driving motors X205 of the main rotor X20.

With the above-mentioned structure, a free propeller assembly X1 is formed.

In order to avoid wear between the structures during rotation and allow smoother rotation, bearings may be mounted between the circular shaft X10 and the main rotor X20 and between the open end X206 of each blade mounting structure X202 and the end X401, which is provided with the slot X403 and the rotating shaft X404, of each rotor blade of the rotor blade assembly X40. As shown in FIG. 2, the rotating shaft X404 on the end X401 of each rotor blade of the rotor blade assembly X40 may be detachable from the end X401 of each rotor blade of the rotor blade assembly X40 and may be connected with the end X401 via connecting ways, such as locking, engaging, mounting and the like, for easy assembling.

The free propeller assembly X1 is assembled and used as follows. The signal transmitting device X30 is mounted in the mounting structure X103 on the outer side surface X101 of the circular shaft X10. Then the circular shaft X10 mounted with the signal transmitting device X30 is mounted in the shaft hole X201 of the main rotor X20. As for the main rotor X20, the multiple blade mounting structures X202 are radially disposed on the periphery of the main rotor X20, each of the blade mounting structures X202 is provided with the positioning recess X203, and the positioning recess X203 is mounted with the decoder X204, the driving motor X205, and so on. The main rotor X20 is driven to rotate on the outer side surface X101 of the circular shaft X10. When each decoder X204 rotates along with the rotor blade assembly X40 and passes by one of the light beam emitters X301 of the signal transmitting device X30, the light beam emitter X301 transmits signals to the decoder X204 to instruct the decoder X204 to drive the driving motor X205 to turn. Since a driving shafts X207 of the driving motor X205 is connected in the end X401 of each rotor blade of the rotor blade assembly X40, the rotor blades of the rotor blade assembly X40 is turned to predetermined angles. In particular, in the free propeller assembly X1 of the present invention, rotation angles of the rotor blades of the rotor blade assembly X40 do not limited by mechanical structure and no mechanical losses are caused. Therefore, the rotor blades can agilely turn, and improved effects are especially obvious on the free propeller assembly X1 having more rotor blades. As shown in FIG. 4, when the rotor blade X405 of the rotor blade assembly X40 is moved to a position XA, the rotor blade X405 is instructed to turn to an angle that allows an airflow to flow downward. When the rotor blade X405 is moved to a wrong position, the rotor blade X405 is instructed to turn to other angles for level flight. When the rotor blade X405 is moved to a diagonal position XA2 diagonal to the position XA, the rotor blade X405 is instructed to turn to an angle that is opposite to the angle turned at the position XA and allows an airflow to flow upward. This allows more power winds to help an aircraft having the free propeller assembly structure to fly and be steered more agilely, which is impossible for conventional mechanical propeller assembly.

In particular, in the free propeller assembly X1, the controllable rotor blades X405 are able to freely turn 360 degrees. With reference to FIG. 5, take a tandem free Double Free propeller assembly-vertical ascent aircraft Y1 for example. In the free propeller assembly X1, with instructions from the signal transmitting device X30, when the rotor blades X405 pass above a fuselage of the aircraft Y1 (as shown in the dotted area XF in FIG. 5), each rotor blade X405 passing above the fuselage is controlled to turn to become horizontal and thus the fuselage of the tandem free Double Free propeller assembly-vertical ascent aircraft Y1 is not subjected to wind pressure. When the rotor blades X405 pass outside the aircraft Y1, each rotor blade X405 passing outside the aircraft Y1 is controlled to form a downward wind pressure and quantity of the wind pressure can be controlled by adjusting the angle of each rotor blade X405. Therefore, in addition to allow the wind pressures to be fully used for vertical takeoff of the aircraft Y1, the free propeller assembly X1 does not waste energy and the fuselage of the aircraft Y1 does not have to resist the wind pressures. Moreover, since each rotor blade X405 of the free propeller assembly X1 can be turned 360 degrees, the rotor blades X405 can be turned to a largest angle to allow the free propeller assembly X1 to form the wind pressure far more large than the wind pressure formed by a conventional propeller assembly. Accordingly, an aircraft having the free propeller assembly X1 has increased weight capacity and is able to fly in the thin air of the plateau. Since the free propeller assembly X1 can be driven by new energy that is generated without oxygen for combustion, such as electricity, the aircraft having the free propeller assembly X1 is able to fly higher.

With reference to FIGS. 6A to 6E, with the controllable rotor blades X405 that are able to freely turn 360 degrees, the free propeller assembly X1 can be controlled to freely form the wind pressures at different positions. As shown in FIG. 6A, the rotor blades X405 can be controlled to form upward or downward wind pressure at one dotted area XF1 and the wind pressure is also controllable at the empty area, so as to steer the aircraft having the free propeller assembly X1 of the present. As shown in FIG. 6B, the rotor blades X405 can also be controlled to form wind pressures at two dotted areas XF1, XF2. As each rotor blade X405 passes the two dotted areas XF1, XF2, the rotor blade X405 can be adjusted to form a suitable wind pressure. For instance, when the aircraft flies toward the right, the wind pressure at right of the fuselage of the aircraft is adjusted to flow upward and the wind pressure at left of the fuselage of the aircraft is adjusted to flow downward. Under mutual cooperation of the wind pressures, the helicopter or the aircraft having the free propeller assembly X1 can be flexibly steered. Especially coupled with adjusting the angle of the rotor blades X405 to change or increase the wind pressures, the aircraft can move faster.

In other words, the free propeller assembly X1 transmits signals through the signal transmitting device X30 and the rotor blades X405 on the main rotor X20 receive the signals as the main rotor X20 rotates in 360 degrees. Thus, as shown in FIGS. 6C, 6D, and 6E, each of the rotor blades X405 can be precisely controlled to turn to a specific angle at different positions, so as to produce the wind pressures that are controllable, which is one of the main objectives of the present invention.

Figure 7:
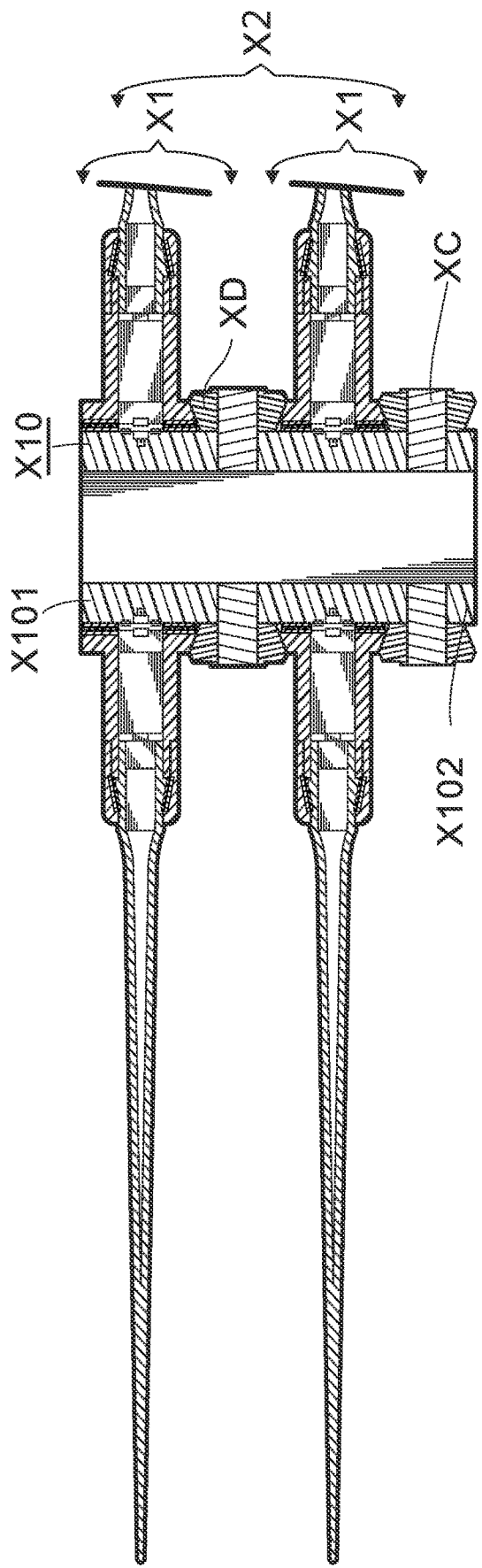
FIG. 7 is an enlarged cross-sectional side view of a second embodiment of a coaxial dual double free propeller assembly in accordance with the present invention.
Figure 8:
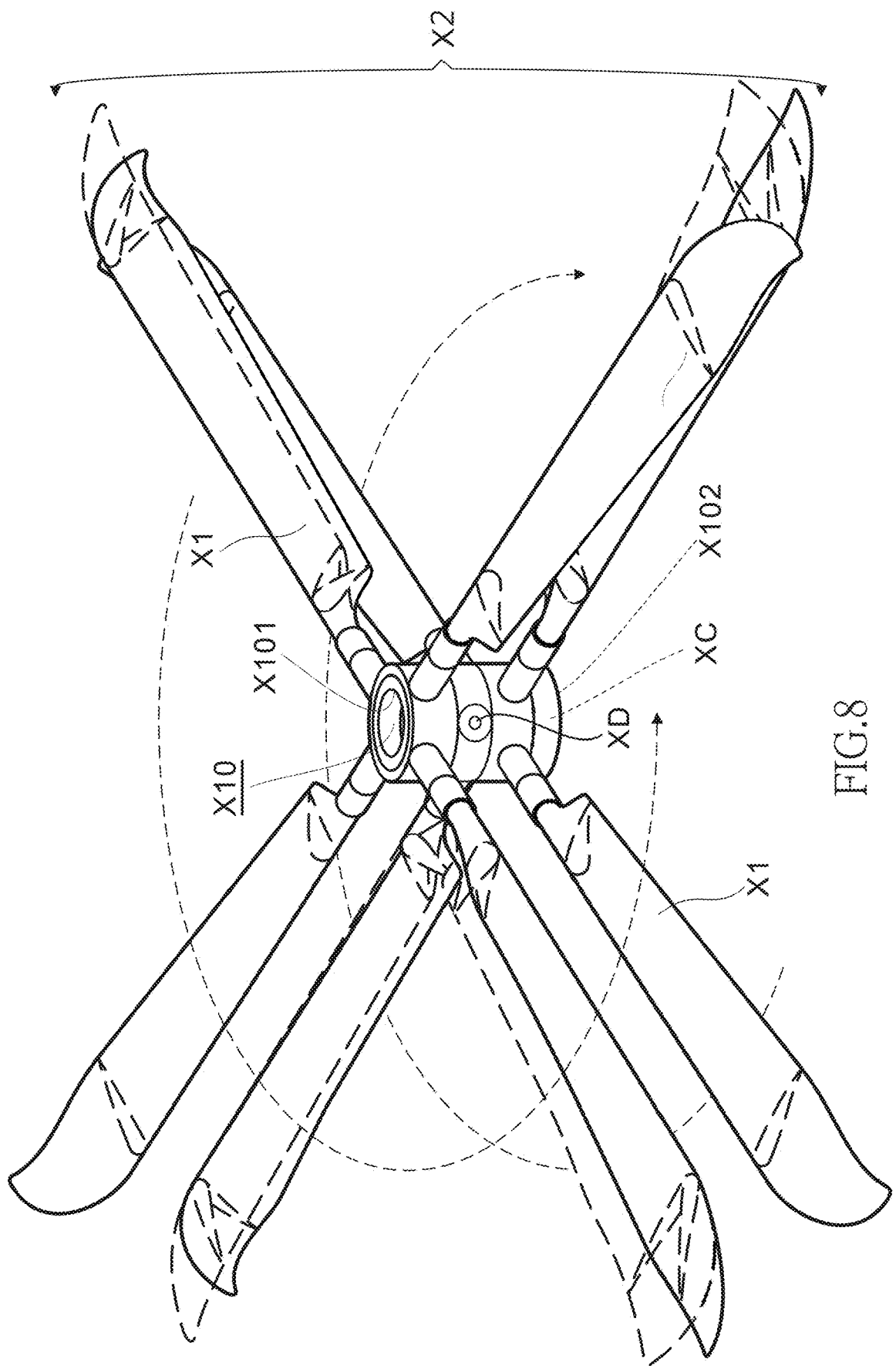
FIG. 8 is a perspective view of the second embodiment of the coaxial dual double free propeller assembly in FIG. 7.

With further reference to FIGS. 7 and 8, a second preferred embodiment of the present invention is shown. Two free propeller assemblies X1 of the first preferred embodiment are provided, wherein the circular shafts X10 of the two free propeller assemblies X1 are integrally formed as a single part, such that the circular shaft X10 is elongated for the two free propeller assemblies X1 to be mounted on the elongated circular shaft X10 and overlap each other. Thus, a double propeller assembly for all embodiments of the present invention is provided. In the free propeller assembly X2, a transmission mechanism XC that is driven by a power source drives one of the free propeller assemblies X1 to rotate and drives the other free propeller assembly X1 to rotate reversely via a gear set XD. Thus, a coaxial dual double free propeller assembly X2 is formed.

Figure 9:
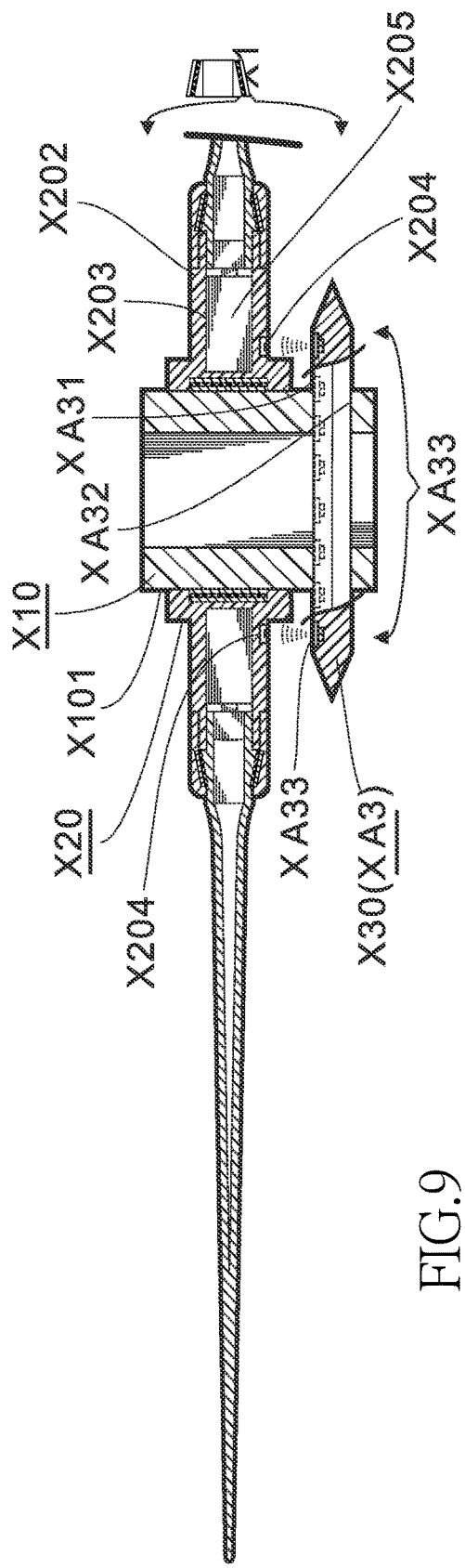
FIG. 9 is an enlarged cross-sectional side view of a third embodiment of a free propeller assembly in accordance with the present invention.

With reference to FIG. 9, a third preferred embodiment of the present invention is shown. One free propeller assembly X1 of the first preferred embodiment is provided and the signal transmitting device X30 is formed by a carrier XA3. The carrier XA3 is formed as a disk and is mounted around the circular shaft X10. The disk-shaped carrier XA3 has two surfaces XA31, XA32 and is annularly disposed around the outer side surface X101 of the circular shaft X10. One surface XA31 of the carrier XA3 is provided with multiple signal transmitters XA33 that are able to transmit electronic signals or photonic signals or other signals that can be interpreted. The carrier XA3 may be detachably or integrally positioned on the outer side surface X101 of the circular shaft X10. A main rotor X20 has multiple blade mounting structures X202 radially disposed on a periphery of the main rotor X20. Each of the blade mounting structures X202 is provided with a positioning recess X203. The positioning recess X203 is mounted with a decoder X204, a driving motor X205, and so on. The decoders X204 faces toward the signal transmitters XA33. As the decoders X204 and the signal transmitters XA33 face each other, they can work like the decoders X204 and the signal transmitting device X30 in the first preferred embodiment. The difference from the first preferred embodiment is that the decoders X204 and the signal transmitting device X30 in the first preferred embodiment are horizontally arranged. When taking the carrier XA3 in substitution, the signal transmitters XA33 on the carrier XA3 and the decoders X204 in the blade mounting structures X202 correspond in position to each other in the other direction. This design diversifies structures of the free propeller assembly X1. The blade mounting structures X202 may be disposed above or below the carrier XA3. In this preferred embodiment, the blade mounting structures X202 is disposed below the carrier XA3.

Figure 10:
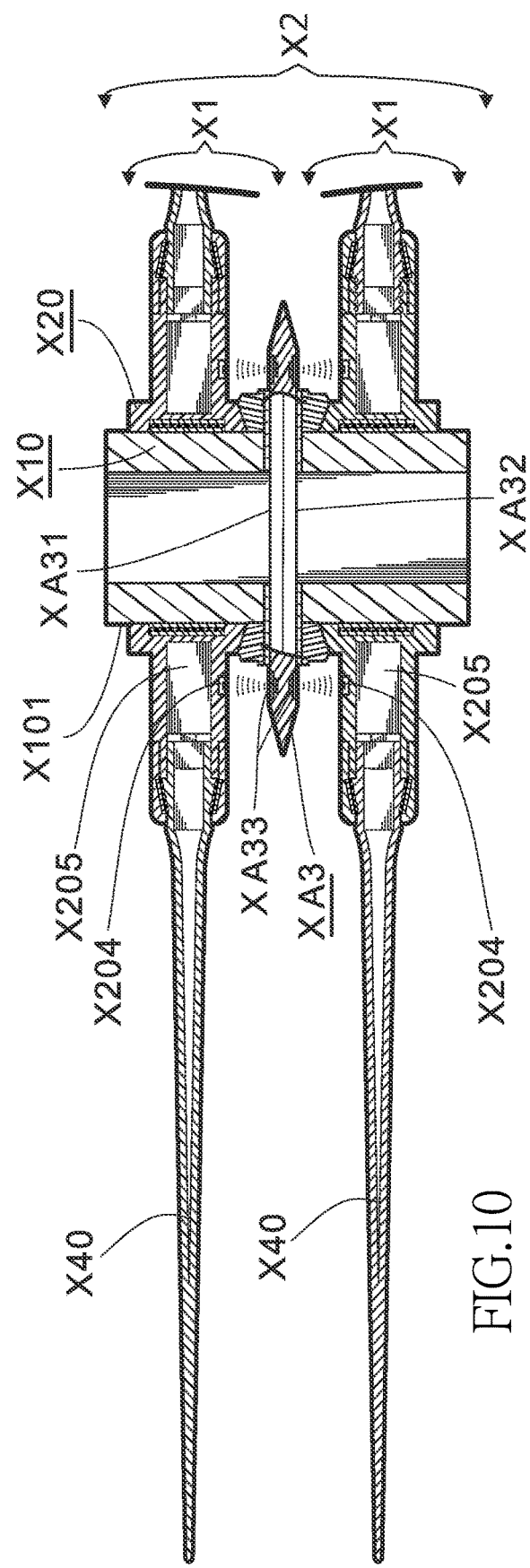
FIG. 10 is an enlarged cross-sectional side view of a fourth embodiment of a free propeller assembly in accordance with the present invention.

With further reference to FIG. 10, a fourth preferred embodiment of the present invention is shown. One coaxial dual double free propeller assembly X2 of the second preferred embodiment and the carrier XA3 having the two surfaces XA31, XA32 are provided.

The other surface XA32 of the carrier XA3 is also provided with multiple signal transmitters XA33 and the carrier XA3 is disposed between the two free propeller assembly X1 of the coaxial dual double free propeller assembly X2, so as to provide functions similar to that of the coaxial dual double free propeller assembly X2.

The circular shaft X10 has said two ends X104, X105.

Figure 13:
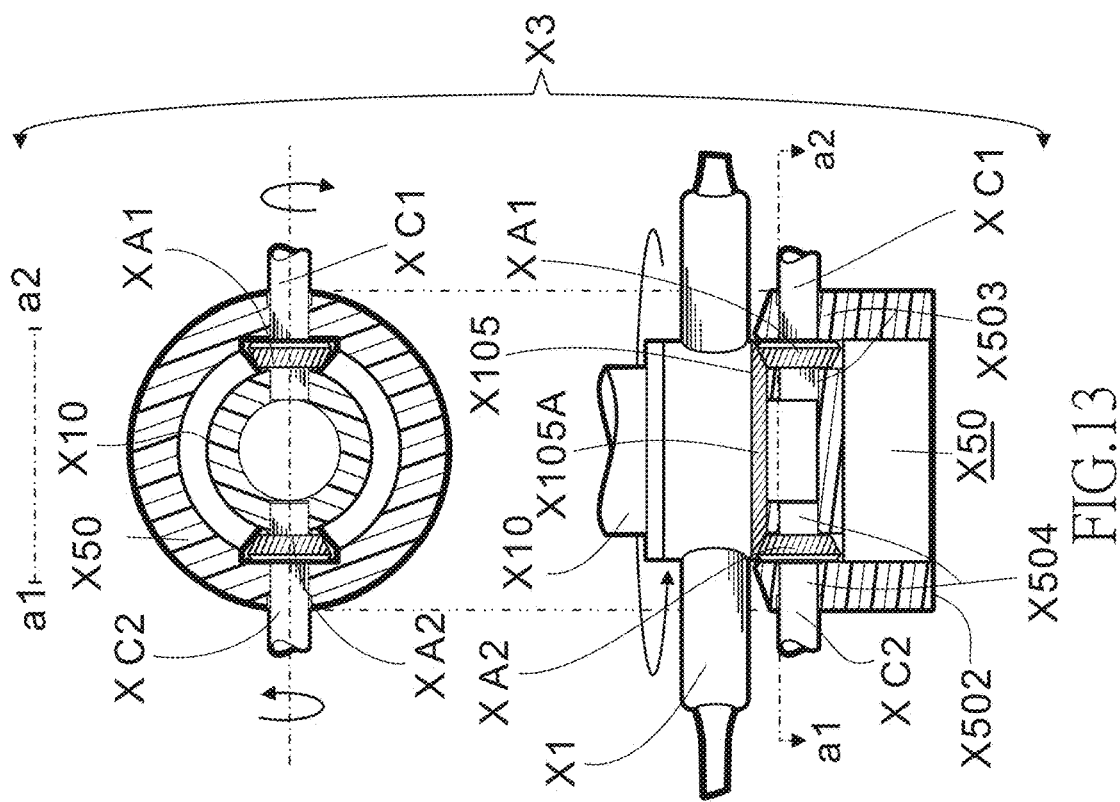
FIG. 13 are an enlarged side view in partial section and an enlarged top view in partial section of a sixth embodiment of a free propeller assembly in accordance with the present invention.
Figure 12:
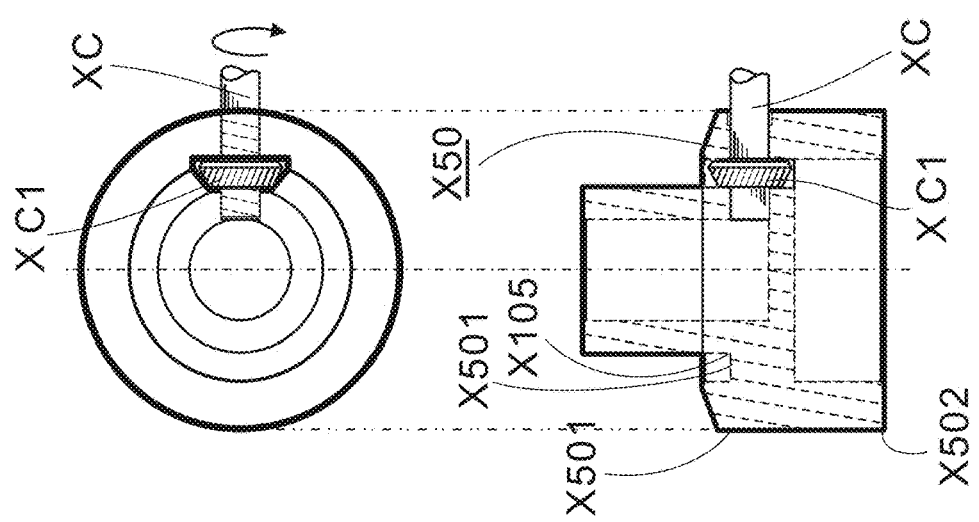
FIG. 12 are a side view and a top view of the adapting base in FIG. 11.
Figure 11:
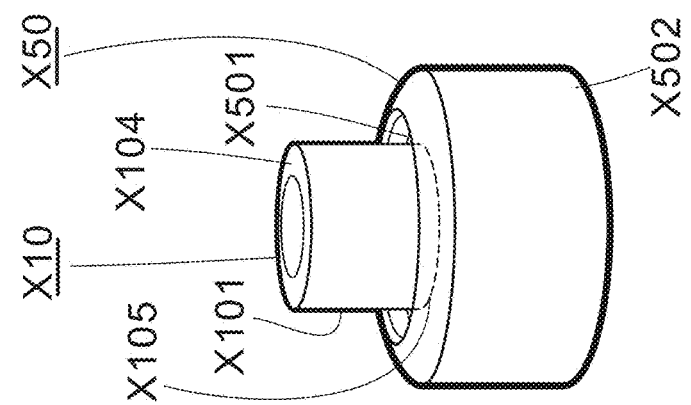
FIG. 11 is a perspective of an adapting base of a fifth embodiment of a pedestal free propeller assembly in accordance with the present invention.

With further reference to FIGS. 11 and 12, a fifth preferred embodiment of the present invention is shown. One end X105 of the circular shaft X10 of the free propeller assembly X1 is mounted with an adapting base X50. The adapting base X50 is formed as a geometric column and has an end X501 and a fixed end X502. The end X501 is connected with the end X105 of the circular shaft X10. The fixed end X502 is provided with a connecting structure, such as locking structure, engaging structure, welding structure, detachably engaging structure, and the like, such that the free propeller assembly X1 can be connected to any object for operation via the adapting base X50. Furthermore, a diameter of the end X501 of the adapting base X50 is different from a diameter of the outer side surface X101 of the circular shaft X10. Thus, as shown in FIG. 13, it is convenient for designing a transmission mechanism XC that drives the main rotor X20 on the circular shaft X10 via a first gear XA1, so as allow the free propeller assembly X1 to work. The adapting base X50 also allows the free propeller assembly X1 to be mounted on an aircraft that needs to fly via the fixed end X502 of the adapting base X50. Accordingly, a pedestal free propeller assembly X3 is formed.

With further reference to FIG. 13, a sixth preferred embodiment of the present invention is shown. With the free propeller assembly X1 shown in the first preferred embodiment and the adapting base X50 shown in the fifth preferred embodiment, the transmission mechanism XC further has a gear X105A disposed on an end edge of the main rotor X20 and a first gear XA1 disposed in the adapting base X50 and corresponding in position to and engaging with the gear X105A. The first gear XA1 is connected to and driven by a first transmission rod XC1 and is restraint in a first shaft hole X503. Thus, the first gear XA1 drives the main rotor X20 to rotate on the circular shaft X10.

Moreover, the adapting base X50 may be further provided with a second gear XA2, a second transmission rod XC2, and a second shaft hole X504. The second gear XA2 is restraint and is rotatable in the second shaft hole X504. Except for providing more rotating force to the main rotor X20, the second transmission rod XC2 may be connected to a motor of a power storage equipment and the first transmission rod XC1 may also be connected to a motor of a power storage equipment to store electric power or output power. In this preferred embodiment, the free propeller assembly X1 may also be mounted on an aircraft that needs to fly via the fixed end X502 of the adapting base X50.

With further reference to FIG. 14, a seventh preferred embodiment of the present invention is shown. As the free propeller assembly X1 and the adapting base X50 described in the sixth preferred embodiment, the adapting base X50 may be provided with multiple gears XA3. Specifically, four gears XA3 are presented. Each of the gears XA3 is connected to and is driven by a transmission rod XB, and the gears XA3 and the transmission rods XB are disposed in shaft holes X505 of the adapting base X50 respectively, allowing the gears XA3 to transmit power.

Moreover, the adapting base X50 is further provided with a recess X506. An engine XP and a bevel gear XE are mounted in the recess X506. The engine XP drives the gears XA3 to rotate directly through the bevel gear XE, or the engine XP may drives the gears XA3 to rotate directly through a reducer XPT and then the bevel gear XE, so as to drive the main rotor X20 and the circular shaft X10 to rotate. In this preferred embodiment, the free propeller assembly X1 may also be mounted on an aircraft that needs to fly via the fixed end X502 of the adapting base X50. Accordingly, a free propeller assembly with engine XP1 is formed.

With further reference to FIG. 15, an eighth preferred embodiment of the present invention is shown. Two free propeller assemblies X1 overlap each other on the circular shaft X10 and form a coaxial dual Double free propeller assembly with engine X2P. Two end edges of the main rotor X20 of the lower free propeller assembly X1 are provided with two gears X105A, X105B respectively. With the engine XP driving the bevel gear XD to rotate, the gears X105A, X105B are driven to rotate through the gears XA3. Accordingly, the two free propeller assemblies X1 rotate as well, so as to form the coaxial dual Double free propeller assembly with engine X2P. In this preferred embodiment, the free propeller assembly X1 may also be mounted on an aircraft that needs to fly via the fixed end X502 of the adapting base X50.

Figure 16:
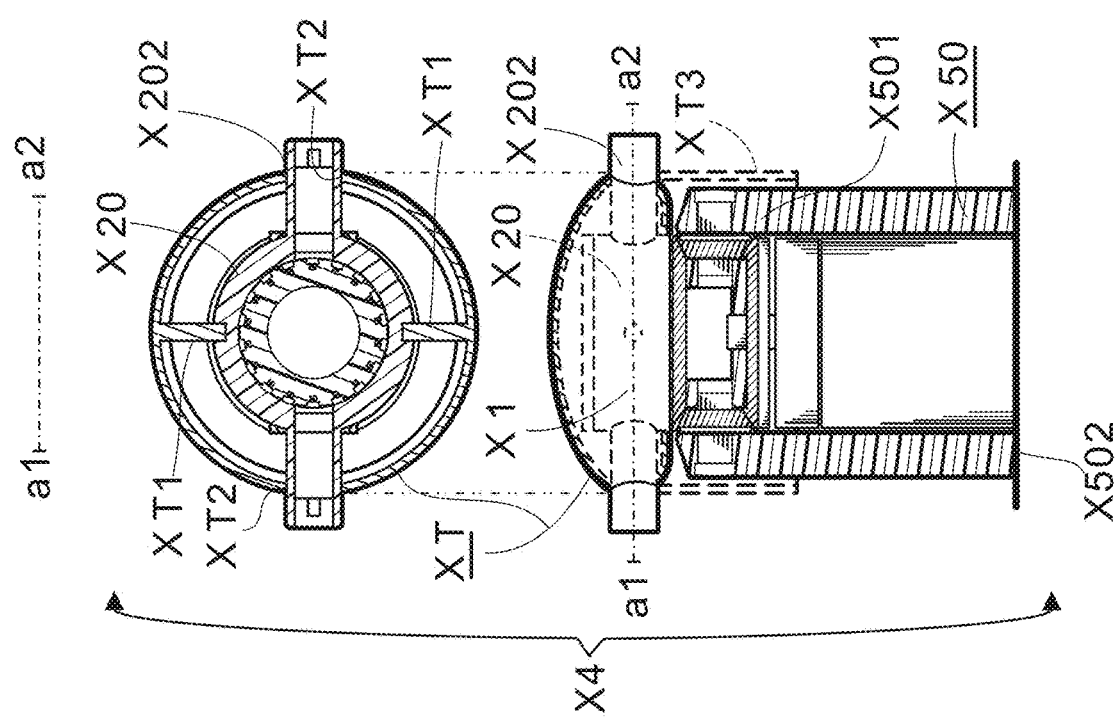
FIG. 16 are an enlarged side view in partial section and an enlarged top view in partial section of a ninth embodiment of a protection type free propeller assembly in accordance with the present invention.

With further reference to FIG. 16, a ninth preferred embodiment of the present invention is shown. The free propeller assembly X1 is further provided with a protective cover XT. The protective cover XT is hollow and is securely attached to the main rotor X20 through multiple positioning bars XT1. Specifically, two positioning bars XT1 are presented. The positioning bars XT1 avoid the blade mounting structures X202. The protective cover XT is provided with multiple through slots XT2 and the blade mounting structures X202 of the main rotor X20 are mounted through the through slots XT2 respectively. Specifically, two through slots XT2 are presented. In addition, the protective cover XT3 may be formed as a hat (as shown in dotted lines). The hat-shaped protective cover XT3 is mounted around the end X501 of the adapting base X50. With this design, the free propeller assemblies of all of the above-mentioned preferred embodiments are protected and are free from being damaged by sands and dusts and waterproofed. If some sealing ring are further provided, this preferred embodiment of the free proper assembly would not be damaged even when being submerged in water. In this preferred embodiment, the free propeller assembly X1 may also be mounted on an aircraft that needs to fly via the fixed end X502 of the adapting base X50, the rotor blades may still work even when the aircraft enters the water. The aircraft can even fly out of the water. Accordingly, a protection type free propeller assembly X4 is formed.

Figures 17, 18:
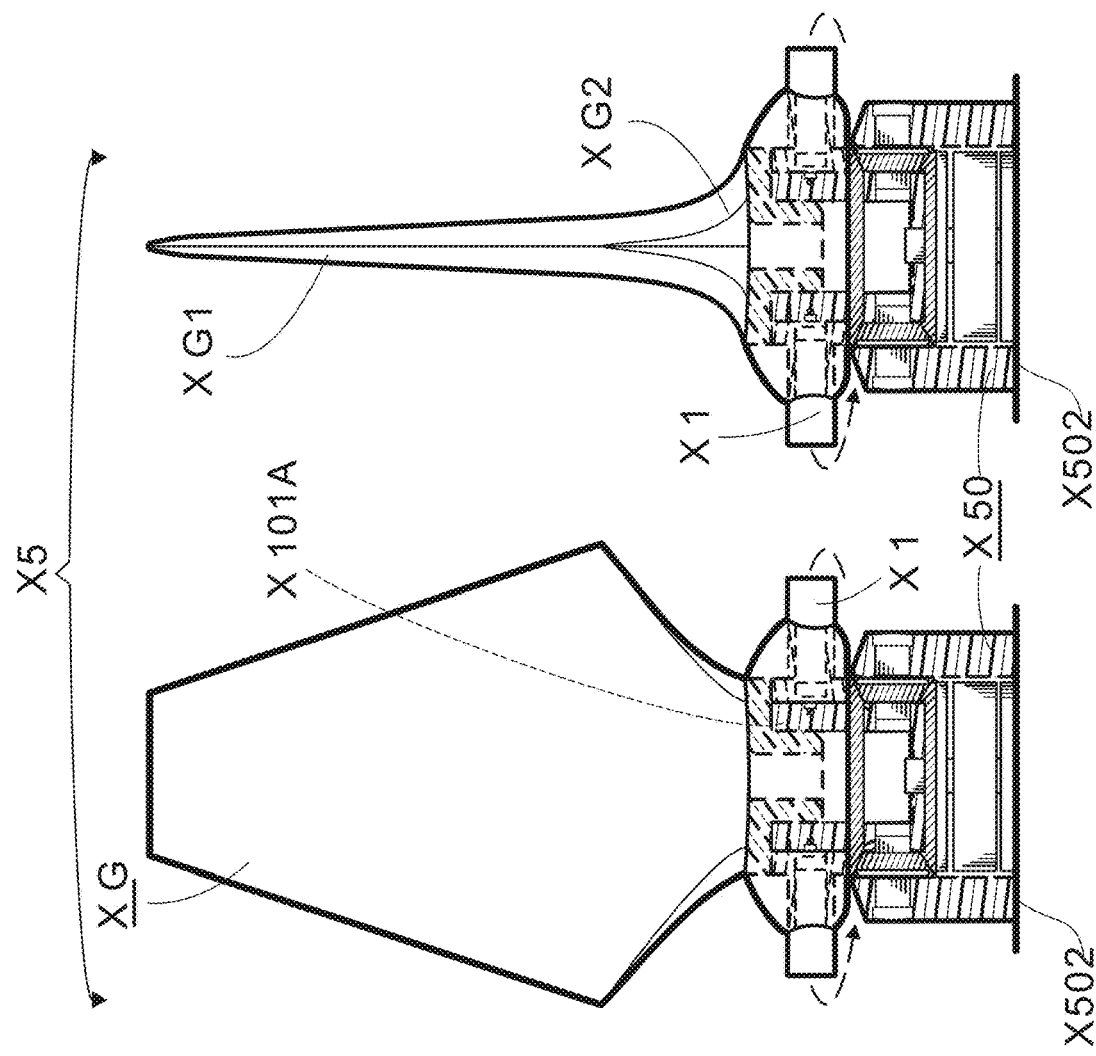
FIG. 17 is an enlarged side view in partial section of a tenth embodiment of a free propeller assembly with vertical wings in accordance with the present invention.
FIG. 18 is another enlarged side view of the free propeller assembly with vertical wings in FIG. 17.

With further reference to FIGS. 17 and 18, a tenth preferred embodiment of the present invention is shown. In order for the free propeller assembly X1 to provide more functions, the end X104 of the circular shaft X10 is further provided with a fixed end X101A. The fixed end X101A allows other structure to lock, engage, weld, detachably engage with the fixed end X101A, such that the free propeller assembly X1 is able to be connected with any object for operation via the fixed end X101A. In this preferred embodiment, a vertical stabilizer fin XG that is like a vertical tail of an aircraft is provided. The vertical stabilizer fin XG is flat XG1 and has an end being geometric shaped. The end XG2 is mounted through the protective cover XT and then is securely attached to the fixed end X101A of the circular shaft X10. In this preferred embodiment, the free propeller assembly X1 may also be mounted on an aircraft that needs to fly via the fixed end X502 of the adapting base X50. Accordingly, a free propeller assembly with vertical wings X5 is formed.

Figure 19:
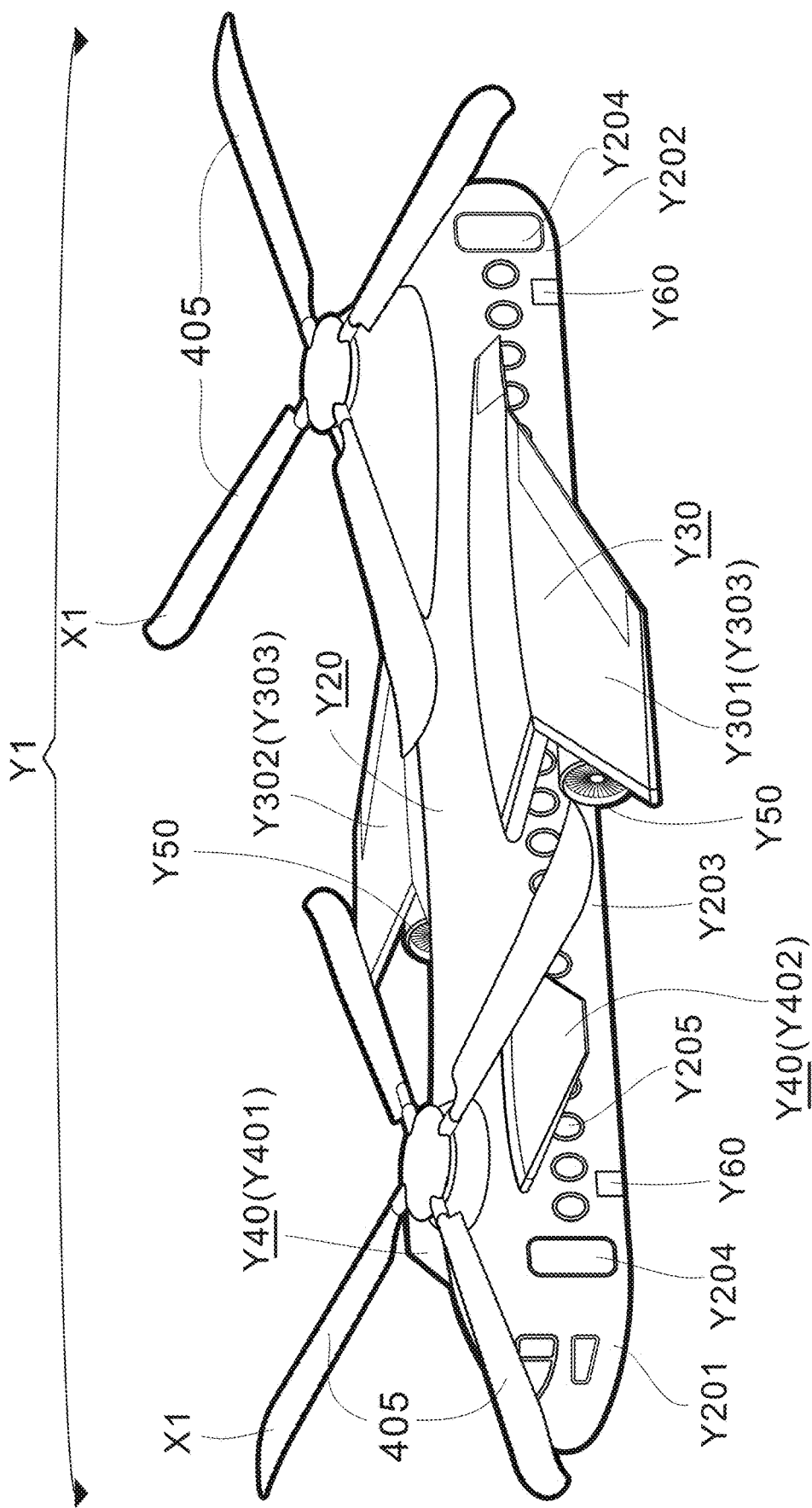
FIG. 19 is a perspective view of an eleventh embodiment of a tandem free double free propeller assembly-vertical ascent aircraft in accordance with the present invention.
Figure 20:
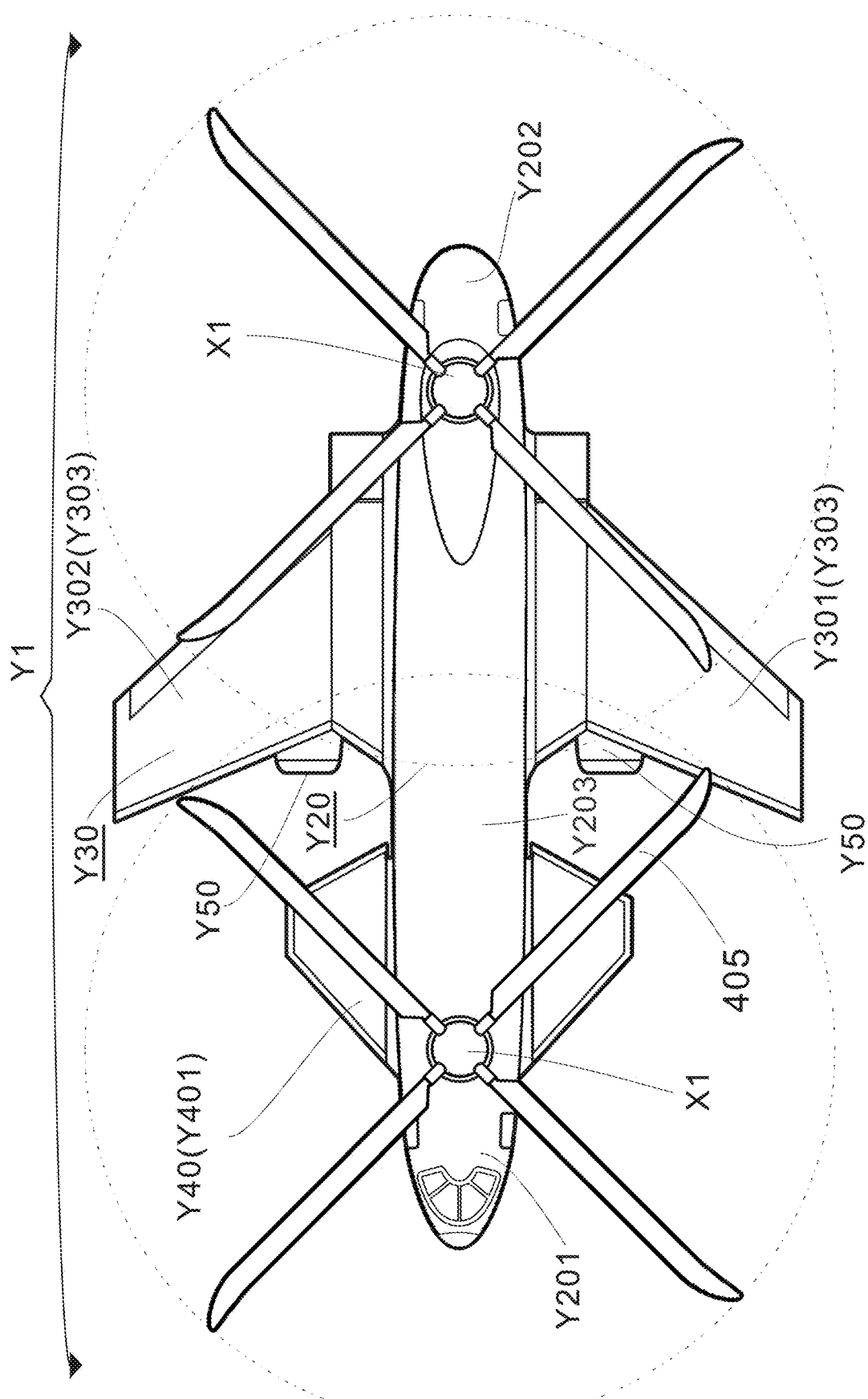
FIG. 20 is a top view of the eleventh embodiment of the tandem free double free propeller assembly-vertical ascent aircraft in FIG. 19.
Figure 21:
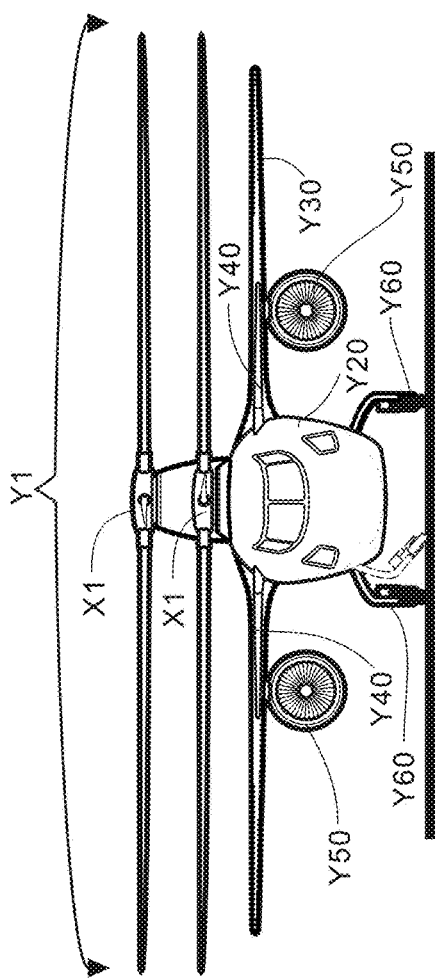
FIG. 21 is a front view of the eleventh embodiment of the tandem free double free propeller assembly-vertical ascent aircraft in FIG. 19.

With further reference to FIGS. 19, 20, and 21, an eleventh preferred embodiment of the present invention is shown. Two sets of free propeller assemblies with engines XP1 as described in the seventh preferred embodiment of the present invention are provided. Moreover, a fuselage Y20, a main wing assembly Y30, an aileron assembly Y40, two propeller engine assemblies Y50, and a landing gear Y60.

The fuselage Y20 is formed as a long and wide cabin Y203 which has two ends Y201, Y202. The long and wide cabin Y203 is provided with multiple cabin doors Y204 and multiple viewing windows Y205. The other structures and an interior of the long and wide cabin Y203 is based on a conventional airplane, such as the conventional passenger plane or the conventional cargo plane.

The main wing assembly Y30 has two wings Y301, Y302 disposed oppositely on the long and wide cabin Y203. Each of the wings Y301, Y302 may be conventional wings such as forward-swept wings, swept wings, delta wings, variable-sweep wings, and so on. In this preferred embodiment, the forward-swept wings Y303 are provided.

The aileron assembly Y40 has two ailerons Y401, Y402 disposed oppositely on the end Y201 of the long and wide cabin Y203. The aileron assembly Y40 may include any kind of the conventional ailerons.

The propeller engine assemblies Y50 are mounted in suitable places of the wings Y301, Y302 respectively and may be conventional engines such as turboprop engines, jet engines, turbofan engines, thrust vector control engines, and so on or any newly designed engines.

The landing gear Y60 is mounted on a bottom of the long and wide cabin Y203 and may be any conventional landing gear for the aircraft.

Accordingly, a tandem free double free propeller assembly-vertical ascent aircraft Y1 with two free propeller assemblies disposed on a front and a rear respectively.

The tandem free double free propeller assembly-vertical ascent aircraft Y1 has features as follows.

1. With the free propeller assembly X1, space occupied by conventional mechanical propeller and other complicated structures can be greatly reduced and the aircraft Y1 can be driven by a variety of power sources. In this preferred embodiment, two free propeller assemblies X1 are disposed at the front and the rear of the aircraft Y1 respectively to provide lifting force. With propulsion of the propeller engine assembly Y50 on the forward-swept wings Y303, the tandem free double free propeller assembly-vertical ascent aircraft Y1 taxies until a lifting force is generated. Then the power of the free propeller assemblies X1 can be turned off. In this preferred embodiment, since the forward-swept wings Y303 for generating the lifting force in high efficiency are provided, sufficient lifting force for lifting the tandem free double free propeller assembly-vertical ascent aircraft Y1 can be form in low speed. Meanwhile, in order to avoid resistant force when the rotor blades X405 of the tandem free double free propeller assembly-vertical ascent aircraft Y1 stop operating, the rotor blades X405 of the free propeller assembly X1 may be turned to become horizontal (as shown in FIGS. 5 and 6A to 6E), so as to reduce said resistant force. When the rotor blades X405 turn downwind, with the signals from the signal transmitting device X30 of the free propeller assembly X1, each of the rotor blades X405 can be turned to the angles that can be used for generating wind power and then the wind power is stored in a power storage equipment. The power storage equipment provides power for the next vertical takeoff or vertical landing of the tandem free double free propeller assembly-vertical ascent aircraft Y1. This makes it possible that the tandem free double free propeller assembly-vertical ascent aircraft Y1 does not consume the energy it carries. This also makes it possible that an air passenger and cargo aircraft for low to medium altitude can flexibly take off and land in short distance without airport runway, just like a bus on land.

2. The aileron assembly Y40 provides assistance for the tandem free double free propeller assembly-vertical ascent aircraft Y1 to climb and fly.

3. In addition to the convention swept wings, the forward-swept wings Y303 in this preferred embodiment may also be used in the main wing assembly Y30. In addition to efficiently provide the lifting force, the forward-swept wings Y303 reduces power loss of the free propeller assembly X1 and reduces weight of the power storage equipment, so as to make flight of the present invention more efficient. In particular, the aircraft Y1 of the present invention is a type of rotorcraft, which is for vertical takeoff and landing rather than structurally for high-speed flight. However, the aircraft Y1 of the present invention can fly in a higher speed than the conventional helicopter. To transportation within 500 kilometers, the aircraft Y1 of the present invention which can vertically take off and landing without the airport runway can bring great changes and is also the aircraft the whole world wants to create.

Figure 22:
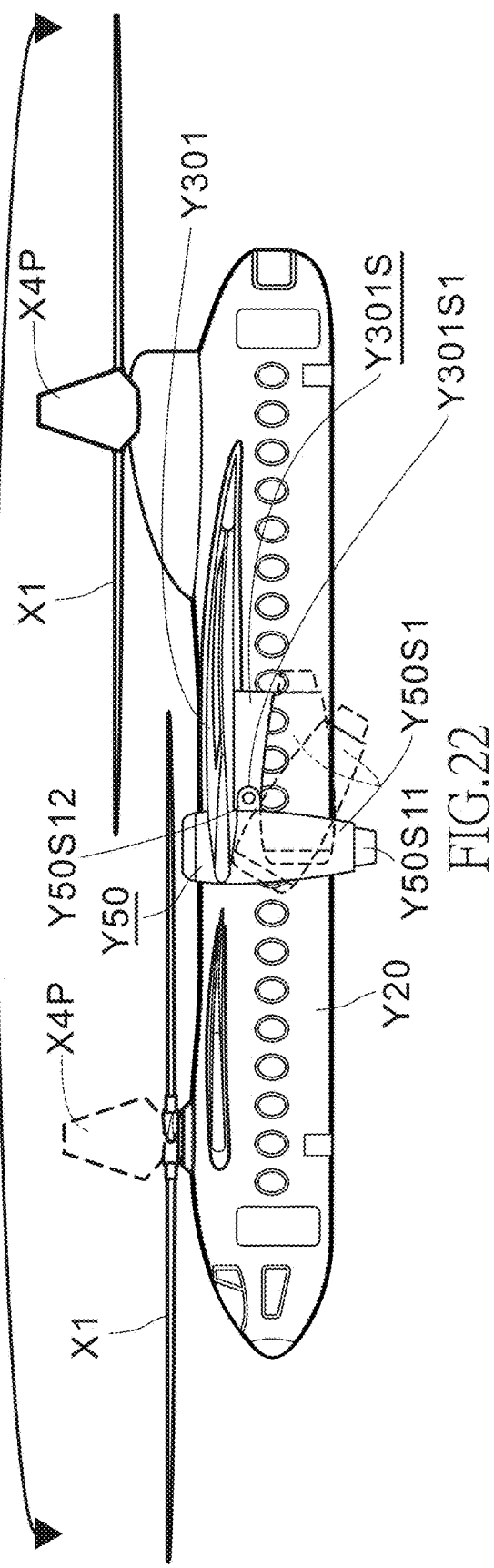
FIG. 22 is a side view of a twelfth and a thirteenth embodiments of a tandem free double free propeller assembly-vertical ascent aircraft in accordance with the present invention.

With further reference to FIG. 22, a twelfth and a thirteenth preferred embodiments of the present invention are shown. In order to improve flight stability of the tandem free double free propeller assembly-vertical ascent aircraft Y1, the free propeller assemblies with vertical wings X4P of the tenth preferred embodiment of the present invention are used. Moreover, in order to provide more power for the tandem free double free propeller assembly-vertical ascent aircraft Y1 of the present invention to vertically take off and land, in addition to two free propeller assemblies X1, the two propeller engine assemblies Y50 are designed as rotatable engine assemblies Y50S1. Nozzles Y50S11 of the rotatable engine assemblies Y50S1 thrust downward, so as to provide more power to the vertical takeoff and landing when the fuselage Y20 carries more weight.

The two rotatable engine assemblies Y50S1 are connected to ends Y301S1 of two bracket pivots Y301S on the two wings Y301, Y302 via two rotatable pivots Y50S12 respectively, so as to provide basic rotatable structure to the rotatable engine assemblies Y50S1.

Figure 23:
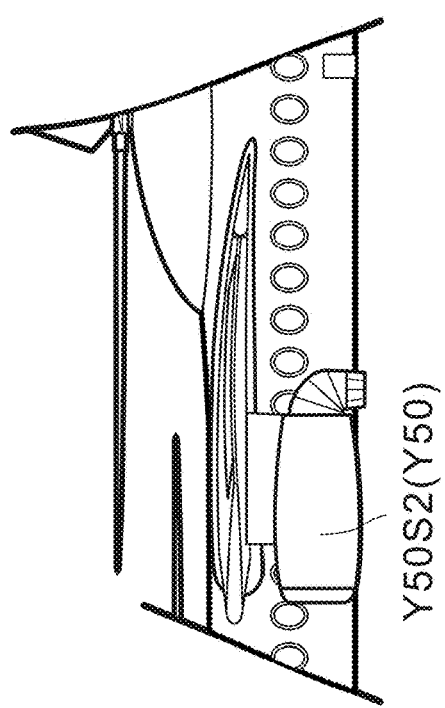
FIG. 23 is an enlarged side view of a fourteenth embodiment of an aircraft in accordance with the present invention.

With further reference to FIG. 23, a fourteenth embodiment of the present invention is shown. A thrust vector control engine Y50S2 with rotatable exhaust nozzle may be used as the propeller engine assembly Y50 of the tandem free double free propeller assembly-vertical ascent aircraft Y1, so as to provide greater vertical takeoff and landing force to the fuselage Y20 that carries more weight.

With further reference to FIGS. 24 and 25, a fifteenth and a sixteenth embodiments of the present invention are shown. As shown in FIG. 24, one coaxial dual double free propeller assembly X2 of the second preferred embodiment is provided with an upper fuselage Q10 and a lower fuselage Q20 mounted on the coaxial dual double free propeller assembly X2.

The upper fuselage Q10 is formed as an independent platform Q10A and is connected to the open end of the circular shaft X10. On the platform Q10A, space and location for one driver and a safety holder assembly Q10A1 for surrounding people to hold are provided.

The lower fuselage Q20 is formed as an independent cabin and has at least one deck Q201. An interior Q202 of the lower fuselage Q20 is used for mounting all of the power equipment and at least one operator's seat. Thus, the interior Q202 and an external position of the lower fuselage Q20 can be arranged properly.

As describe above, the adapting base X50 is formed as the geometric column, has the end X501 and the fixed end X502, and is further provided with the recess X506. The end X501 of the adapting base X50 is connected with the end X105 of the circular shaft X10. The circular shaft X10 is used for mounting the coaxial dual double free propeller assembly X2. The adapting base X50 is connected to a main structure Q10A2 on a bottom of the platform Q10A through the end X104 of the circular shaft X10, the engine XP is also mounted in the recess X506 of the adapting base X50, and the coaxial dual double free propeller assembly X2 is driven by the bevel gear XE and the gears XA3. The fixed end X502 of the geometric-shaped adapting base X50 is connected to the at least one deck Q201 in the lower fuselage Q20. Accordingly, the upper fuselage Q10 and the lower fuselage Q20 can be combined together.

Moreover, the coaxial dual Double free propeller assembly X2 is mounted on the outer side surface X101 of the circular shaft X10.

As described above, the coaxial dual double free propeller assembly X2 is a basic design for an aircraft that has an upper fuselage and a lower fuselage. The pilot sits above the coaxial dual double free propeller assembly X2 for easy escape while accident happens. Moreover, a center of gravity of the aircraft does not restraint by the operator's seat and control equipment, and loads and positions of the loads on the aircraft can be arranged more properly. The coaxial dual double free propeller assembly X2 works as a pivot point of the upper fuselage Q10 and the lower fuselage Q20, such that the aircraft of the present invention is safe and can move with agility.

In addition, an annular housing TA2 may be mounted on the main rotor X20 of the coaxial dual double free propeller assembly X2 via multiple connecting bars TA1, so as to form an annular protective cover AT. The annular protective cover AT has multiple through holes TA3 for disposing the multiple blade mounting structures X202. This annular protective cover AT may be used on all of the above-mentioned preferred embodiments, such that the free propeller assembly X1 (the coaxial dual double free propeller assembly X2 is taken for example in this preferred embodiment) is not damaged by sands, dusts, and rain. Also, since the coaxial dual double free propeller assembly X2 has only one main rotor X20 that rotates, noise can be greatly reduced compared to the conventional propeller assembly having many rotors and hinges. Therefore, a rotorcraft having any one of the free propeller assemblies of the above-mentioned preferred embodiments can be a silent rotorcraft.

As the sixteenth preferred embodiment of the present invention shown in FIG. 25, at least one seat Q702 and an enclosing housing is further mounted on the platform Q10A1 to form an independent housing-like upper fuselage structure Q70. The upper fuselage structure Q70 further has a movable transparent cover Q701 for people to enter therein or to exit therefrom. Moreover, a landing gear is mounted to the lower fuselage for the convenience of landing.

With further reference to FIG. 26, a seventeenth preferred embodiment of the present invention is shown. Based on the sixteenth preferred embodiment of the present invention, an upper fuselage structure Z10 and a lower fuselage structure Z20 are further provided.

The upper fuselage structure Z10 is elongated, is a hollow independent housing, has two ends Z101, Z102, and is able to accommodate at least two seats Z103. In this preferred embodiment, four seats are presented. Moreover, two connecting structures Z104, Z105 are mounted to a bottom of the upper fuselage structure Z10.

The lower fuselage structure Z20 is elongated, is also a hollow independent housing, and has two ends Z201, Z202, such that a hollow structure Z203 is defined inside the lower fuselage structure Z20 with at least one deck Z204 is mounted in the lower fuselage structure Z20.

Two free propeller assemblies with engines XP1 are mounted to the two connecting structures Z104, Z105 of the upper fuselage structure Z10 and the at least one deck Z204 in the hollow structure Z203 of the lower fuselage structure Z20 having the two ends Z201, Z202 via one end X104 of the circular shaft X10 and the fixed end X502 of the adapting base X50, so as to form a tandem free propeller assembly with double cabin structure Helicopter Y2.

In addition, one of the free propeller assemblies with engines XP1 is connected to the other free propeller assembly with engine XP1 via a transmission shaft XBZ for connecting the transmission rods XB that are driven by gears. With the above-mentioned design, even when one of the free propeller assemblies with engines XP1 fails, the helicopter Y2 of this preferred embodiment can still work without affecting flight safety. Furthermore, the transmission shaft XBZ also allows the two free propeller assemblies X1 to rotate synchronously to offset torque formed by the two free propeller assemblies X1. Moreover, a landing gear is also provided.

With further reference to FIG. 27, an eighteenth embodiment of the present invention is shown. Based on the seventeenth preferred embodiment, the upper fuselage structure Z10, the lower fuselage structure Z20 and the pedestal free propeller assembly X3 are further provided. Connections between the upper fuselage structure Z10, the lower fuselage structure Z20 and the pedestal free propeller assembly X3 are the same as described in the fifth, fifteenth, sixteenth, and seventeenth preferred embodiments, and therefore are omitted. What is different is that only one pedestal free propeller assembly X3 is used. The pedestal free propeller assembly X3 is mounted between the upper fuselage structure Z10 and the lower fuselage structure Z20. The pedestal free propeller assembly X3 may be replaced by anyone of the above-mentioned free propeller assemblies, so as to form a free propeller assembly with double cabin structure Helicopter Y3.

With further reference to FIG. 28, a nineteenth embodiment of the present invention is shown. Based on the seventeenth preferred embodiment, the upper fuselage structure Z10, the lower fuselage structure Z20 and the pedestal free propeller assembly X3 are provided. Connections between the upper fuselage structure Z10, the lower fuselage structure Z20 and the pedestal free propeller assembly X3 are the same as described in the fifth, fifteenth, sixteenth, and seventeenth preferred embodiments, and therefore are omitted. What is different is that only one pedestal free propeller assembly X3 is used. The pedestal free propeller assembly X3 is mounted between the upper fuselage structure Z10 and the lower fuselage structure Z20. Furthermore, multiple gyros and multiple flywheels D are mounted to the two ends Z101, Z102 of the upper fuselage structure Z10 and the two ends Z201, Z202 of the lower fuselage structure Z20. With the vertically disposed double fuselages that have never been used in an aircraft, the gyros and the flywheels D are boldly used, attempting to balance the torque of the free propeller assembly X1. The gyros control magnitude of rotating forces DP1, DP2 of the flywheels D. Moreover, the flywheels D mounted on the ends Z101, Z102, Z201, Z202 of the upper fuselage structure Z10 and the lower fuselage structure Z20 form a torque to balance the torque DP3 formed by the free propeller assembly X1. Therefore, under a specific condition, a helicopter of this preferred embodiment is able to balance the torque DP3 with only one free propeller assembly X1 and without any tail assembly. Moreover, the upper fuselage structure Z10 and the lower fuselage structure Z20 may be elongated, so as to provide greater reversal torque. Thus, the helicopter is able to make huge improvements in balancing torque of the propeller assembly. Accordingly, a double-cabin helicopter and free propeller assembly balance force Y4 can be formed.

With further reference to FIG. 29, a twentieth embodiment of the present invention is shown. The lower fuselage structure Z20 is replaced by a fuselage without cabin XZ1. Wings on the fuselage without cabin XZ1 may be forward-swept wings or swept-wings and the coaxial dual double free propeller assembly X2 may be used. In this way, the fuselage used in this preferred embodiment may be variable. For instance, a fuselage without wings may be used to form a high speed rotorcraft that can vertically take off and land, a fuselage with forward-swept wings or swept-wings may be used to form a subsonic jet plane. In addition to allow the rotorcraft or the jet plane to vertically take off and land, the pilot can also escape without hindered by the propeller assembly. The pilot inside the upper fuselage structure may safely escape with a jet seat in the conventional jet plane, so as to form a free propeller assembly with high-speed dual-cabin helicopter Y5.

Figure 30:
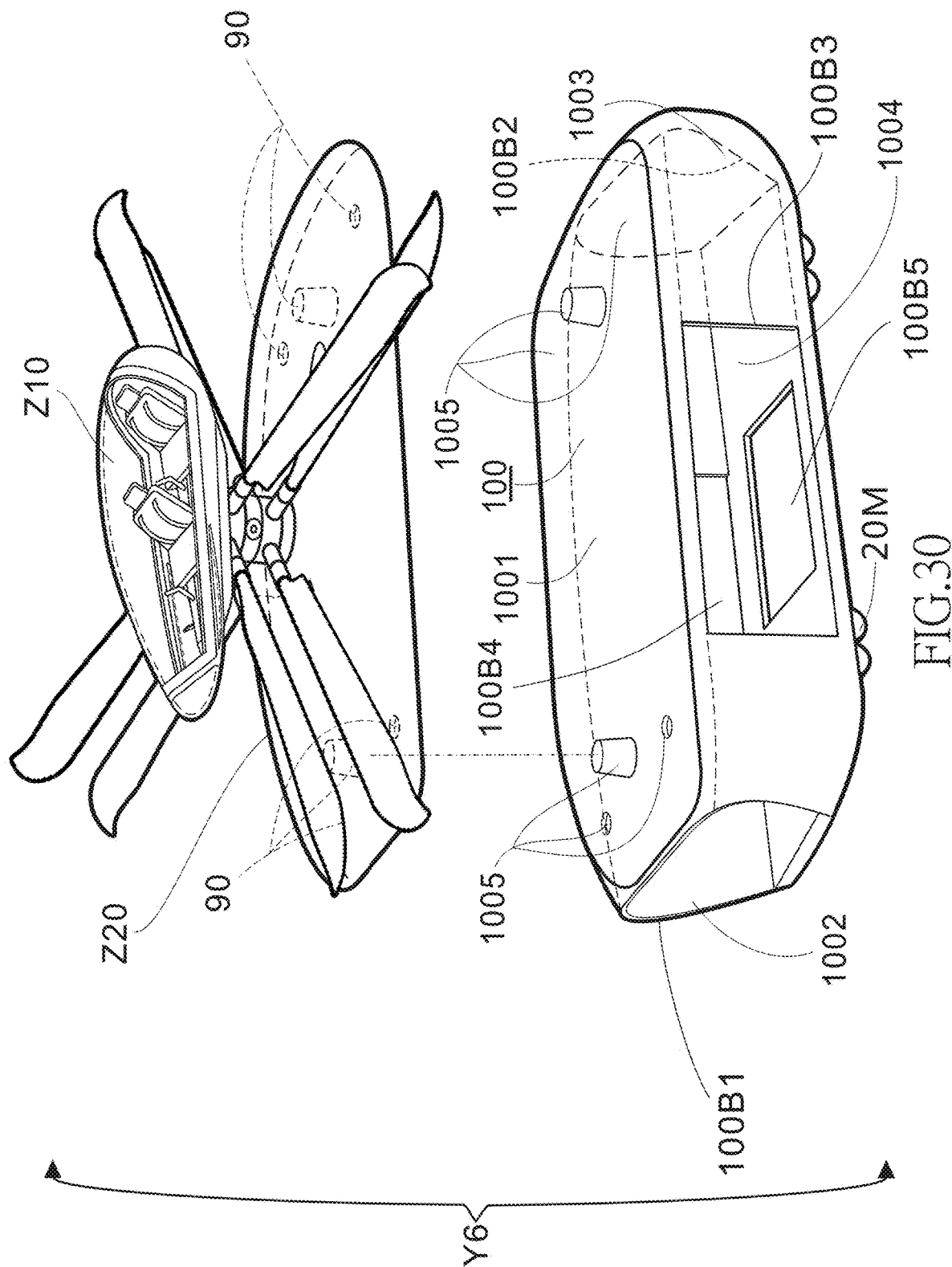
FIG. 30 is an exploded perspective view of a twenty-first embodiment of an aircraft in accordance with the present invention.

With further reference to FIG. 30, a twenty-first embodiment of the present invention is shown. Based on the seventeenth preferred embodiment, the upper fuselage structure Z10, the lower fuselage structure Z20 and the coaxial dual double free propeller assembly X2 are provided. Furthermore, a combination cabin 100 and a connecting assembly 90 are provided.

The combination cabin 100 has a housing 1001 and two ends 1002, 1003. The combination cabin 100 is formed by multiple frames and multiple decks covered by multiple skins and a receiving space 1004 is defined inside the combination cabin 100. The combination cabin 100 may be provided with any equipment or structure as need, so as to meet the requirements of different missions. In addition, a connecting mechanism 1005 for being connected with the connecting assembly 90 of the lower fuselage structure Z20 may be provided on a suitable position of a top of the combination cabin 100. The connecting assembly 90 and the connecting mechanism 1005 may be formed as through holes, locking holes, engaging recesses, hooks, hanging rings, mounting rods, or any other structures that can brake each other, so as to allow the combination cabin 100 to meet the requirements of different uses. Moreover, the combination cabin 100 for different uses is mounted to the lower fuselage structure Z20, so as to meet the requirements of different missions. Furthermore, landing gear assemblies for different uses may be mounted below the combination cabin 100 according to different needs for the convenience of all kinds of landings.

At least one opening with door or at least one hatch may be disposed on a front 100B1, a back 100B2, two opposite sides 100B3, 100B4 and a bottom 100B5 of the combination cabin 100 for people to enter or exit the combination cabin 100. With multiple openings with doors or multiple hatches disposed on the combination cabin 100, ambulance staffs, cargos and equipment for emergency rescue may be quickly arranged. As describe above, a combined helicopter cabin free propeller assembly double cabin helicopter Y6 is provided.

With further reference to FIG. 31, a twenty-second embodiment of the present invention is shown. The combination cabin 100 may be formed as a passenger cabin 100A. The passenger cabin 100A is provided with multiple windows 100A1 and multiple hatches 100A2. Inside the passenger cabin 100A, multiple rows of seats are provided. Other facilities for flight safety are the same as that in the conventional airplanes and may be put in the passenger cabin 100A of this preferred embodiment as needed.

With further reference to FIG. 32, a twenty-third embodiment of the present invention is shown. The combination cabin 100 may be a water cabin 100C for extinguishing fires. An interior of the water cabin 100C is divided into multiple vertically arranged compartments 100C1 and multiple transversely connected areas 100C2. With the multiple hatches as described in the twenty-first preferred embodiment and according to positions and number of the hatches, when flying toward a fire zone, water in the vertically arranged compartments 100C1 is able to balance the water cabin 100C and to keep the water cabin 100C stable. The transversely connected areas 100C2 are arranged along the vertically arranged compartments 100C1 at intervals. Thus, the water in the water cabin 100C flows quickly for the convenience of drawing water form water source such as reservoirs, rivers, ponds, swinging pools or any pool that can be dived directly thereinto directly, and releasing the water for firefighting.

In the drawings of all of the embodiments of the present invention described above, the numeral numbers and the purposes and functions of the structures that the numeral numbers indicate are presented for the convenience of showing the present invention rather than showing the actual dimensions, thickness and detailed structures.

The appearances of all of the embodiments of the present invention shown above can be modified and designed to conform to the aerodynamics. Thus, the appearance of the present invention can be diverse and a disruptive appearance of the present invention that is different from conventional helicopters can be produced.

As long as the related structures of all of the embodiments of the present invention described above are appropriately modified or the dimensions are changed, the aircraft of the present invention can become unmanned, be used in a variety of dangerous environments, be used as an entertainment toy or an aerial camera, be used for transporting small items or other purpose.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A free propeller assembly structure comprising at least one free propeller assembly and each of the at least one free propeller assembly comprising:
   a circular shaft being stationary during operation and having an outer side surface and two ends;
   a main rotor, the main rotor rotating during operation and having a shaft hole, wherein the circular shaft is mounted in the shaft hole of the main rotor; and
   multiple blade mounting structures radially disposed on a periphery of the main rotor, each blade mounting structure having a positioning recess and a driving motor mounted inside the positioning recess;
   a signal transmitting device including multiple signal transmitters that are able to transmit interpretable electronic signals or photonic signals; and
   a rotor blade assembly including at least two rotor blades, each rotor blade being elongated and having two ends, and one end of each rotor blade connected with an open end of the positioning recess of a corresponding one of the blade mounting structures.

2. The free propeller assembly structure as claimed in claim 1, wherein the positioning recess of each blade mounting structure is mounted with a decoder.

3. The free propeller assembly structure as claimed in claim 2, wherein the signal transmitters of the signal transmitting device are mounted on the outer side surface of the circular shaft and correspond in position to the decoders respectively, and each signal transmitter radially transmits signals outwardly.

4. An aircraft structure comprising:
   a first free propeller assembly comprising:
   a first circular shaft being stationary during operation and having an outer side surface and two ends;
   a first main rotor, the first main rotor rotating during operation and having a shaft hole, wherein the first circular shaft is mounted in the shaft hole of the first main rotor; and
   multiple blade mounting structures radially disposed on a periphery of the first main rotor, each blade mounting structure having a positioning recess and a driving motor mounted inside the positioning recess;
   a first signal transmitting device including multiple signal transmitters that are able to transmit interpretable electronic signals or photonic signals; and
   a first rotor blade assembly including at least two rotor blades, each rotor blade of the first rotor blade assembly being elongated and having two ends, and one end of each rotor blade of the first rotor blade assembly connected with an open end of the positioning of a corresponding one of the blade mounting structures of the first main rotor;
   a second free propeller assembly comprising:
   a second circular shaft being stationary during operation and having an outer side surface and two ends;
   a second main rotor, the second main rotor rotating during operation having a shaft hole, wherein the second circular shaft is mounted in the shaft hole of the second main rotor; and
   multiple blade mounting structures radially disposed on a periphery of the second main rotor, each blade mounting structure having a positioning recess and a driving motor mounted inside the positioning recess;
   a second signal transmitting device including multiple signal transmitters that are able to transmit interpretable electronic signals or photonic signals; and
   a second rotor blade assembly including at least two rotor blades, each rotor blade of the second rotor blade assembly being elongated and having two ends, and one end of each rotor blade of the second rotor blade assembly connected with an open end of the positioning of a corresponding one of the blade mounting structures of the second main rotor;
   a fuselage formed as a long and wide cabin and having two ends;
   a main wing assembly having two wings disposed oppositely on the long and wide cabin;
   two propeller engine assemblies mounted in the wings respectively; and
   wherein the first free propeller assembly and the second free propeller assembly are mounted on a top of the fuselage.

5. The aircraft structure as claimed in claim 4 further comprising an aileron assembly, the aileron assembly having two ailerons disposed oppositely on the end of the long and wide cabin.

6. The aircraft structure as claimed in claim 4, wherein the wings of the main wing assembly are forward-swept wings.

* * * * *